United States Patent
Park et al.

(10) Patent No.: US 10,820,213 B2
(45) Date of Patent: Oct. 27, 2020

(54) METHOD AND APPARATUS FOR ANALYZING COMMUNICATION ENVIRONMENT BASED ON PROPERTY INFORMATION OF AN OBJECT

(71) Applicant: Samsung Electronics Co., Ltd., Suwon-si, Gyeonggi-do (KR)

(72) Inventors: Yoonsung Park, Suwon-si (KR); Sungbum Park, Seoul (KR); Soonyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/816,340

(22) Filed: Nov. 17, 2017

(65) Prior Publication Data
US 2018/0139623 A1    May 17, 2018

Related U.S. Application Data
(60) Provisional application No. 62/423,412, filed on Nov. 17, 2016.

(30) Foreign Application Priority Data

Dec. 8, 2016    (KR) .................. 10-2016-0167131

(51) Int. Cl.
*H04W 16/18* (2009.01)
*G06K 9/00* (2006.01)
(Continued)

(52) U.S. Cl.
CPC ........ *H04W 16/18* (2013.01); *G06K 9/00637* (2013.01); *G06K 9/00657* (2013.01);
(Continued)

(58) Field of Classification Search
CPC ......... H04M 1/72572; H04M 2250/52; H04M 2242/30; H04M 11/007; H04M 3/42;
(Continued)

(56) References Cited

U.S. PATENT DOCUMENTS

| | | | | |
|---|---|---|---|---|
| 5,450,615 A | * | 9/1995 | Fortune | G01R 29/08 455/504 |
| 2002/0093538 A1 | * | 7/2002 | Carlin | G06Q 30/02 715/778 |

(Continued)

FOREIGN PATENT DOCUMENTS

| EP | 0 664 619 A1 | 7/1995 |
|---|---|---|
| EP | 2 615 862 A1 | 7/2013 |

(Continued)

OTHER PUBLICATIONS

Zhenliang Zhang et al., 'Coverage and channel characteristics of millimeter wave band using ray tracing', 2015 IEEE International Conference on Communications(ICC), pp. 1380-1385, Sep. 10, 2015.

(Continued)

*Primary Examiner* — Nimesh Patel
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of Things (IoT) are provided. The present disclosure may be applied to intelligent services based on the 5G communication technology and the IoT-related technology, such as smart home, smart building, smart city, smart car, connected car, health care, digital education, smart retail, security and safety services. The method for analyzing communication environment in a wireless communication system includes receiving image information of an area, identifying at least one object based (Continued)

on the image information, determining property information of the at least one object, and analyzing communication environment for the area based on the property information. Signal attenuation occurs due to at least one of scattering, diffraction, or absorption of a signal by the at least one object.

22 Claims, 23 Drawing Sheets

(51) Int. Cl.
    *H04B 17/27*     (2015.01)
    *H04B 17/391*     (2015.01)
    *G06T 7/70*     (2017.01)
    *G06K 9/46*     (2006.01)

(52) U.S. Cl.
    CPC .............. *G06K 9/4604* (2013.01); *G06T 7/70* (2017.01); *H04B 17/27* (2015.01); *H04B 17/3912* (2015.01); *H04B 17/3913* (2015.01); *G06T 2207/30181* (2013.01)

(58) Field of Classification Search
    CPC ........... H04M 1/72569; H04M 1/6505; H04M 1/72533; H04M 1/575; H04M 2242/15; H04M 16/18; H04M 2250/60; H04M 1/0202; H04W 4/02; H04W 88/02; H04W 4/021; H04W 4/023; H04W 84/18; H04W 4/025; H04W 4/029; H04W 52/0251; H04W 64/006; H04W 4/026; H04W 4/60; H04W 16/18; G06F 3/04815; G06F 2200/1637; G06F 2221/2111; G06F 3/0481; G06F 2203/04802; G06K 9/00657; G06K 9/00637; G06K 9/4604; H04B 17/27; H04B 17/3912; H04B 17/3913; G06T 7/70; G06T 2207/3018
    See application file for complete search history.

(56) References Cited

U.S. PATENT DOCUMENTS

| | | | |
|---|---|---|---|
| 2004/0127224 A1 | 7/2004 | Furukawa et al. | |
| 2004/0236547 A1* | 11/2004 | Rappaport | H04L 41/12 |
| | | | 703/2 |
| 2004/0259554 A1 | 12/2004 | Rappaport et al. | |
| 2005/0091958 A1* | 5/2005 | Zehavi | A01D 46/26 |
| | | | 56/340.1 |
| 2006/0019679 A1 | 1/2006 | Rappaport et al. | |
| 2008/0161005 A1 | 7/2008 | Sato et al. | |
| 2008/0229234 A1* | 9/2008 | Astolfi | G06F 16/957 |
| | | | 715/782 |
| 2008/0297505 A1 | 12/2008 | Elsberg et al. | |
| 2010/0250221 A1 | 9/2010 | Kim et al. | |
| 2011/0122997 A1 | 5/2011 | Lu et al. | |
| 2011/0222372 A1 | 9/2011 | O'Donovan et al. | |
| 2011/0263277 A1* | 10/2011 | Zuniga Gallegos | H04W 16/20 |
| | | | 455/466 |
| 2011/0281526 A1 | 11/2011 | Matsuda et al. | |
| 2011/0287801 A1 | 11/2011 | Levin et al. | |
| 2012/0293356 A1 | 11/2012 | Barthel et al. | |
| 2012/0313946 A1* | 12/2012 | Nakamura | G06F 3/04815 |
| | | | 345/426 |
| 2013/0185024 A1 | 7/2013 | Mahasenan et al. | |
| 2013/0278465 A1 | 10/2013 | Owen | |
| 2014/0004885 A1* | 1/2014 | Demaine | G06F 3/016 |
| | | | 455/456.3 |
| 2015/0293215 A1 | 10/2015 | Kim et al. | |
| 2015/0294511 A1 | 10/2015 | Nishioka et al. | |
| 2016/0007426 A1 | 1/2016 | Ashdown et al. | |
| 2016/0013822 A1 | 1/2016 | Polehn et al. | |
| 2016/0330643 A1 | 11/2016 | Sahin et al. | |
| 2017/0100092 A1 | 4/2017 | Kruse et al. | |
| 2017/0201976 A1 | 7/2017 | Yue et al. | |
| 2017/0277953 A1 | 9/2017 | Stanley | |
| 2017/0277979 A1 | 9/2017 | Allen et al. | |
| 2018/0075746 A1 | 3/2018 | Jiang et al. | |
| 2019/0036598 A1 | 1/2019 | Smyth et al. | |

FOREIGN PATENT DOCUMENTS

| | | | |
|---|---|---|---|
| GB | 2530104 | A | 3/2016 |
| KR | 10-2008-0105369 | A | 12/2008 |
| KR | 10-2011-0019117 | A | 2/2011 |
| WO | 2016/067017 | A1 | 5/2016 |

OTHER PUBLICATIONS

Vittorio Degli-Esposti et al,, 'Ray-Tracing-Based mm-Wave Beamforming Assessment', IEEE Access (vol. 2), pp. 1314-1325, Oct. 31, 2014.
International Search Report dated Aug. 11, 2017 issued in PCT Application PCT/KR2017/002692.
U.S. Non-Final Office Action dated Apr. 17, 2019, issued in U.S. Appl. No. 15/816,291.
Tarng J H et al., "Effective Models in Evaluating Radio Coverage on Single Floors of Multifloor Buildings", IEEE Transactions on Vehicular Technology, IEEE Service Center, Piscataway, NJ, US, vol. 48, No. 3, May 1, 1999, XP011063874, ISSN: 0018-9545.
Yiming Ji et al.,"ARIADNE : A Dynamic Indoor Signal Map Construction and Localization System", MOBISYS 2006. The 4th. International Conference on Mobile Systems, Applications and Services. Uppsala, Sweden, [International Conference on Mobile Systems, Applications and Services], New York, NY : ACM, US, pp. 151-164, XP058108000, DOI: 10.1145/1134680.1134697, ISBN: 978-1-59593-195-5, Jun. 19-22, 2006.
Kareem El-Kafrawy et al., "Propagation Modeling for Accurate Indoor WLAN RSS-Based Localization", Vehicular Technology Conference Fall (VTC 2010—Fall), 2010 IEEE 72nd, IEEE, Piscataway, NJ, USA, pp. 1-5, XP031770063, ISBN: 978-1-4244-3573-9, Sep. 6, 2010.
European Search Report dated Jul. 25, 2019, issued in European Patent Application No. 17872533.9.
European Search Report dated Jul. 25, 2019, issued in European Patent Application No. 17872267.4.
Partial European Search Report dated Jul. 25, 2019, issued in European Patent Application No. 17872534.7.
Zhengqing Yun et al., "Radio propagation modeling in complex environments for wireless communications", Microwaves, Communications, Antennas and Electronics Systems, 2009. COMCAS 2009, IEEE International Conference on, IEEE, Piscataway, NJ, USA, Nov. 9, 2009, pp. 1-4, XP 031614693.
Extended European Search Report dated Nov. 7, 2019, issued in European Patent Application No. 17872534.7.
U.S. Non-final Office Action dated Feb. 7, 2020, issued in U.S. Appl. No. 15/816,291.
U.S. Non-final Office Action dated Jul. 20, 2020, issued in U.S Appl. No. 16/349,475.

* cited by examiner

METHOD AND APPARATUS FOR ANALYZING COMMUNICATION ENVIRONMENT BASED ON PROPERTY INFORMATION OF AN OBJECT

CROSS-REFERENCE TO RELATED APPLICATION(S)

This application claims the benefit under 35 U.S.C. § 119(e) of a U.S. Provisional application filed on Nov. 17, 2016 in the U.S. Patent and Trademark Office and assigned Ser. No. 62/423,412, and under 35 U.S.C. § 119(a) of a Korean patent application filed on Dec. 8, 2016 in the Korean Intellectual Property Office and assigned Serial number 10-2016-0167131, the entire disclosure of each of which is hereby incorporated by reference.

TECHNICAL FIELD

The present disclosure relates to a method and an apparatus for analyzing communication environment in a wireless communication system. More particularly, the present disclosure relates to a method for analyzing a channel based on property information of an object located on a path through which a signal is transmitted.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is to be implemented in higher frequency (mmWave) bands, e.g., 60 GHz bands, so as to allow for higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as advanced access technologies have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology. As described above, a method for estimating channel environment in the 5G communication system and designing a network accordingly is required. The network design determines a location of a transmitter (Tx) that transmits a radio frequency (RF) signal and a set value for transmission to enable a network service over wireless communication in a feature area and determines information of various RF signals at a location of a receiver (Rx) to analyze channel environment based on a mathematical modeling technique or a ray tracing simulation result, thereby determining an optimal Tx location. In this way, various RF signal information (e.g., path loss and coverage) may be provided to analyze the channel environment, and the network design may be performed based on the information.

However, in the 5G system, since a millimeter wave (mmWave) having a short wavelength and strong straightness is used, the signal may be greatly affected depending on properties of objects or obstacles located on a communication path which is the path through which the signal is transmitted, at the time of the network design. Therefore, there is a need for a method of analyzing property information of an object located on a communication path and analyzing a channel state according to the property information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus capable of performing simulation with higher accuracy than performing simulation based on ray tracing to analyze radio frequency (RF) transmission and reception environment.

Another aspect of the present disclosure is to provide a method and an apparatus capable of obtaining more accurate simulation results by identifying property information of an object located on a communication path and reflecting the information on simulation.

Aspects of the present disclosure are not limited to the above-mentioned objects. That is, other aspects that are not mentioned may be obviously understood by those skilled in the art to which the present disclosure pertains from the following description.

In accordance with an aspect of the present disclosure, a method for analyzing a communication environment in a wireless communication system is provided. The method includes receiving image information of an area, identifying at least one object based on the image information, determining property information of the at least one object, and analyzing the communication environment for the area based on the property information. Signal attenuation occurs due to at least one of scattering, diffraction, or absorption of a signal by the at least one object.

In accordance with another aspect of the present disclosure, a computing device for analyzing a communication environment in a wireless communication system is provided. The computing device includes a transceiver transmitting or receiving information, and at least one processor receiving image information of an area, identifying at least one object based on the image information, determining property information of the at least one object, and analyzing the communication environment for the area based on the property information. Signal attenuation occurs due to at least one of scattering, diffraction, or absorption of a signal by the at least one object.

According to the present disclosure, the property information of the object located on the communication path may be identified and the more accurate simulation results may be obtained by reflecting the information on the simulation. Therefore, it is possible to effectively design the network by taking into consideration the influence of the object located on a communication path, at the time of the network design.

In accordance with another aspect of the present disclosure, a method for designing a network in a wireless communication system is provided. The method includes receiving image information of an area, identifying at least one object satisfying a predetermined condition based on the image information, determining real environment information of the at least one object, and performing ray tracing simulation based on the real environment information.

In accordance with another aspect of the present disclosure, a computing device for a network design in a wireless communication system is provided. The computing device includes a transceiver, and at least one processor configured to receive image information of an area, identify at least one object satisfying a predetermined condition based on the image information, determine real environment information of the at least one object, and perform ray tracing simulation based on the real environment information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
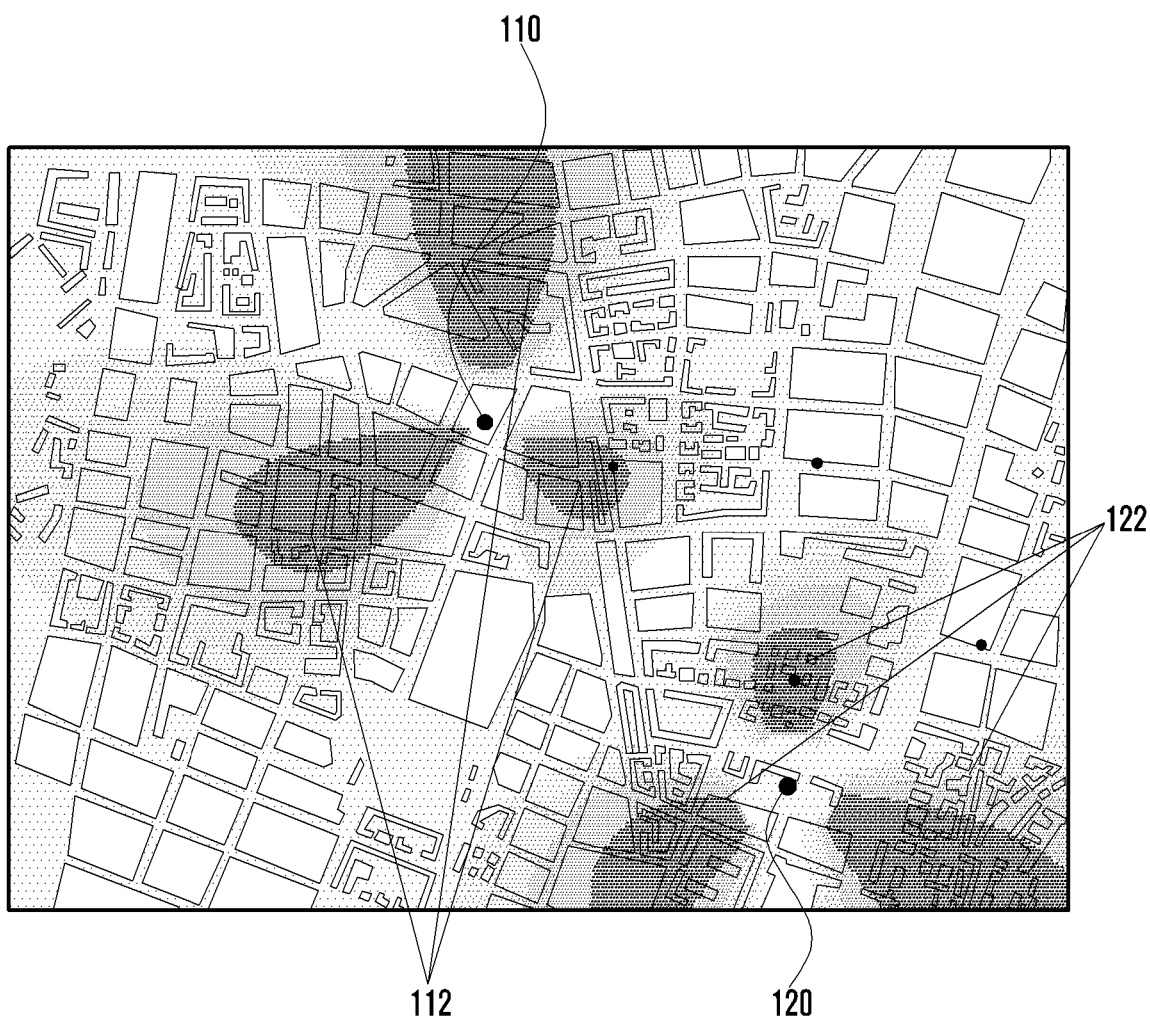
FIG. 1 is a diagram for explaining a network design using a mathematical modeling technique according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operations on the computer or the other programmable data processing apparatuses to create processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

The term '-unit' used in the present embodiment means software or hardware components such as field programmable gate array (FPGA) and application specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card.

Further, in the drawings illustrating a method in embodiments, the order of description does not necessarily correspond to the order of execution, and the order relationship may be changed or executed in parallel.

FIG. 1 is a diagram for explaining a network design using a mathematical modeling technique according to an embodiment of the present disclosure.

Referring to FIG. 1, transmitters 110 and 120 may form transmit beams 112 and 122 to transmit signals.

The mathematical modeling technique may predict RF information based on a function explicitly expressed by a specific signal transmission and reception modeling technique by using a frequency, a distance, and the like of a transmission signal as an input. As illustrated in FIG. 1, each of the transmitters 110 and 120 may form beams 112 and 122 in three directions, so that radio frequency (RF) properties of a transmission signal may be applied by the modeling technique. In this way, the RF information may be predicted with a smaller amount of computation by the mathematical modeling technique, but the accuracy of the modeling for a high-frequency RF signal is lowered.

In order to analyze channel properties related to the high-frequency RF signal, it is possible to consider applying a ray tracing simulation technique. In this case, it is possible to analyze the channel environment by considering possible paths through which the RF signal may be transmitted. However, the computation may be increased when the technique is used. Therefore, a need exists for a method for reflecting real environment on simulation to ensure accuracy.

Figure 2:
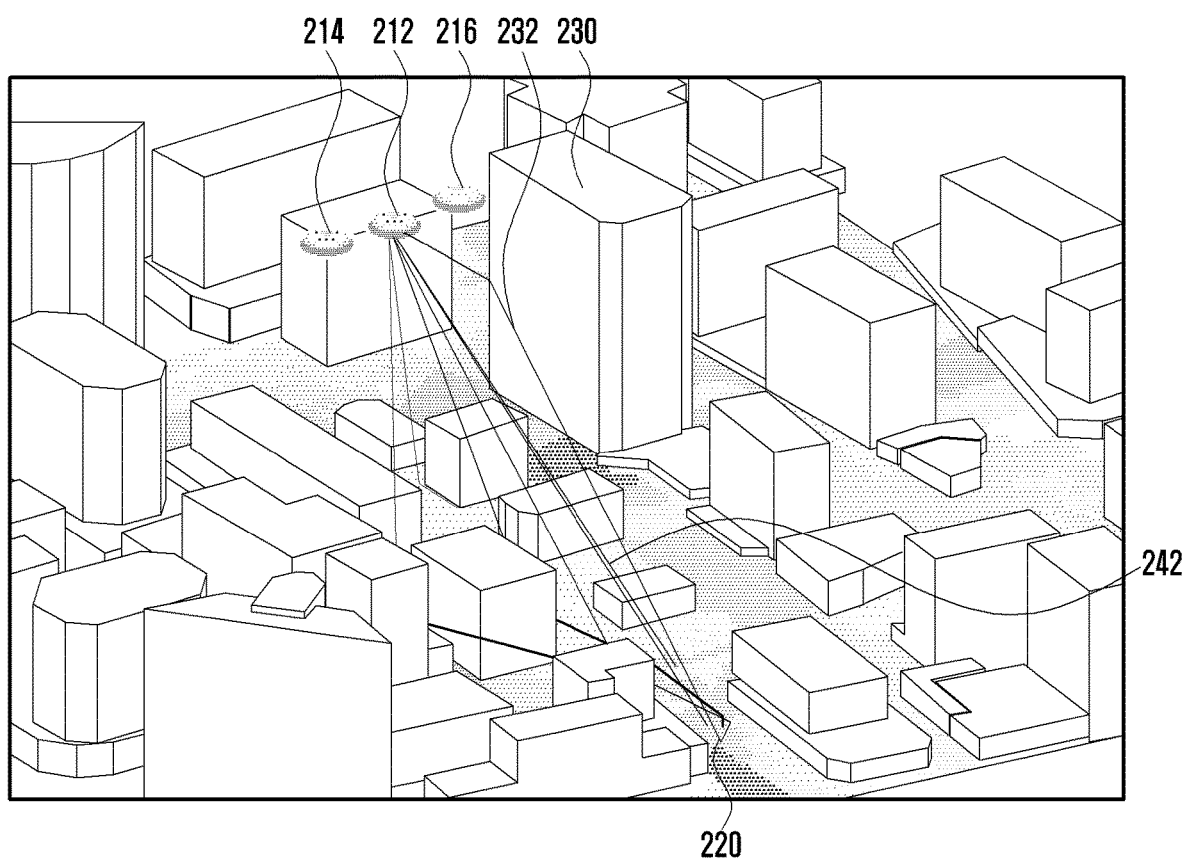
FIG. 2 is a diagram for explaining a ray tracing simulation method according to an embodiment of the present disclosure.

FIG. 2 is a diagram for explaining a ray tracing simulation method according to an embodiment of the present disclosure.

Referring to FIG. 2, if it is assumed that at least one transmitter 212, 214, and 216 transmits a signal, intensity at which the signals transmitted from the respective transmitters 212, 214, and 216 are received is displayed on a map in light and shade. The darker the color, the stronger the reception intensity is, and the lighter the color, the weaker the signal strength is.

More specifically, it is possible to determine the reception strength of a signal in the corresponding area by assuming the location of the receiver 220. In addition, it is also possible to determine transmission channels for each of the possible paths from one transmitter 212 to the receiver 220. There may be a signal 242 directly transmitted from the transmitter 212 to the receiver 220 and a signal 232 reflected from the other object 230 and received. By performing the simulation according to the ray tracing, information on intensity of a signal received from the transmitters 212, 214, and 216 and information on a transmission path of the signal may be acquired in a specific area. When determining the signal reception intensity according to the transmission path of the signal, the receiver 220 may obtain more accurate signal reception information in consideration of at least one of a surface material and an external shape of an object to be reflected. In the embodiment, it is referred to as surface material. However, this does not mean only an outer surface of the object, but includes a material of an inside which may affect a reflection of a radio wave. It is possible to more accurately estimate features of the reflection of the radio wave based on the information. Also, in the embodiment, the receiver location may be determined based on window location information, and the like, and may be obtained based on additional information input to the simulation for the network design or may be obtained by user setting.

Also, obstacles capable of radio wave transmissions may be located on the path through which the signal is directly transmitted. An example of the obstacle may include a tree. However, in addition to the tree, obstacles whose signal attenuation may occur while the radio wave is transmitted may be considered in ray tracing simulation. In this way, more accurate simulation results may be obtained by considering the information on the obstacles capable of radio wave transmission. The tree may be an example of an obstacle located on a communication path to cause signal attenuation upon radio wave transmission and the obstacle may include plant or installations installed a communication path and other objects whose signal attenuation may occur.

As described above, by performing the ray tracing, at least one of the optimal transmitter and receiver locations may be determined on the map. Also, according to the embodiment, the ray tracing simulation may be performed in consideration of a plurality of transmitter location candidates and receiver location candidates, and at least one of the transmitter location and the receiver location may be determined according to the ray racing result. In the embodiment, determining the transmitter location based on the ray tracing simulation may be one feature for the network design. Accordingly, the transmitter determines more locations of transmitter candidates relative to the number expected to be finally installed, performs the ray tracing simulation based on the locations, and acquire a combination of optimal base station locations by post-processing based on the ray information obtained from signals transmitted from all the base station candidates.

As described above, the ray tracing simulation technique may determine the transmission channels for each of the paths through which the RF signal passes, and predict RF signal information at the location of the receiver 220 based on the determination. In the embodiment, the ray tracing simulacrum technique calculates not only a distance in which the signal is transmitted during the determination of the channel environment according to the signal path, but at least one of reflection and diffraction due to environment of the path (e.g., type of media), three-dimensional (3D) terrain and building, thereby more accurately predicting RF signal information. In addition, a channel estimation method using the above technique may accurately reflect the real environment without restrictions depending on the frequency of the RF signal, and may determine at least one of the optimal transmission location and reception location based on the simulation result.

In addition, the fifth generation (5G) network uses a very high frequency signal of 28 to 60 GHz. Therefore, in order to obtain wireless signal information in 5G network design tool, the accuracy may be improved by using the ray tracing simulation technique rather than mathematical modeling technique. In one example of the ray tracing simulation, when estimating a path along which a radio wave is reflected by hitting a building, the reflection may be calculated under the assumption that surfaces of all buildings have the same RF property. However, since reflectance of the RF signal differs depending on a material, an external shape, and a pattern of a reflecting surface, this assumption does not guarantee accurate simulation results. Therefore, a ray tracing technique considering the information is required.

In order to perform the ray tracing simulation, there is a need to acquire a layout and terrain information of a building and analyze signal transmission and reception environment based on a map data mapping the acquired information. Depending on the signal transmission and reception environment, a link between the transmitter and the receiver and the overall performance of a communication system may be analyzed. Also, if the system performance according to the simulation result does not satisfy a predetermined criterion, the ray tracing simulation may be repeatedly performed by considering another transmitter and changing simulation setting. In order to analyze the communication environment of the communication system, particularly, the 5G communication system, an RF planning method and apparatus reflecting properties of a radio wave of mmWave are required. Accordingly, in order to more effectively perform the ray tracing, there is a need to acquire real environment (tree, reflector, and the like) information affecting the propagation environment and perform simulation considering the information. For the RF planning based on the simulation, parallelization, step-by-step analysis technique, and object extraction-based arrangement technique, and the like may be required to improve acceleration and automation.

Also, in the embodiment, there is a need for an RF network planning method and an apparatus using the same for deploying a base station at an efficient location by analyzing a propagation path of a specific area in order to perform a communication service in the corresponding area.

Figure 3A:
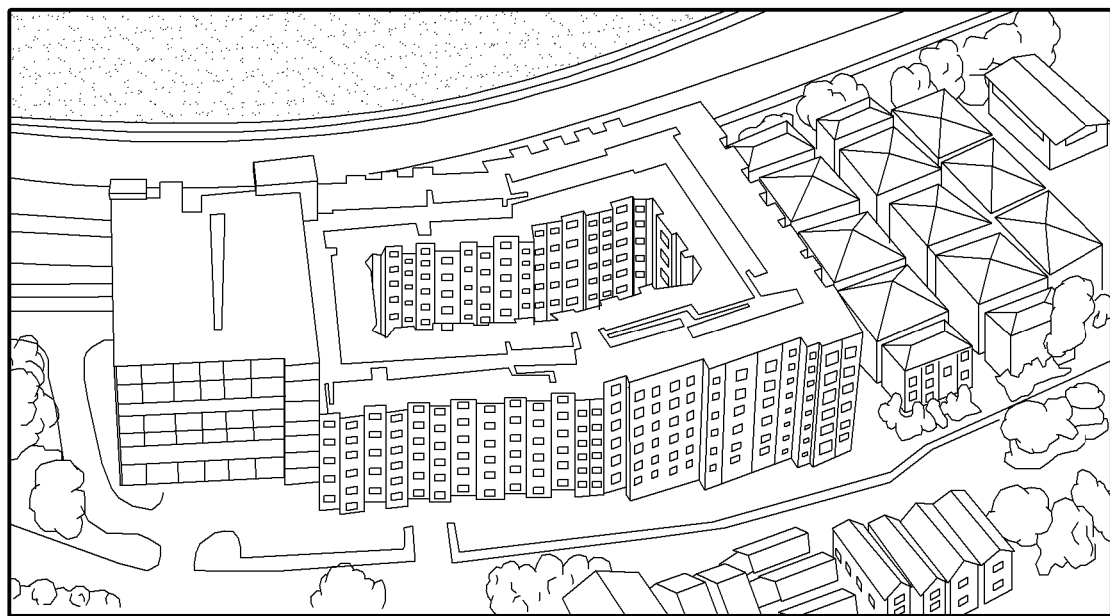
FIGS. 3A and 3B are diagrams for explaining a method for acquiring three-dimensional map information according to an embodiment of the present disclosure.
Figure 3B:
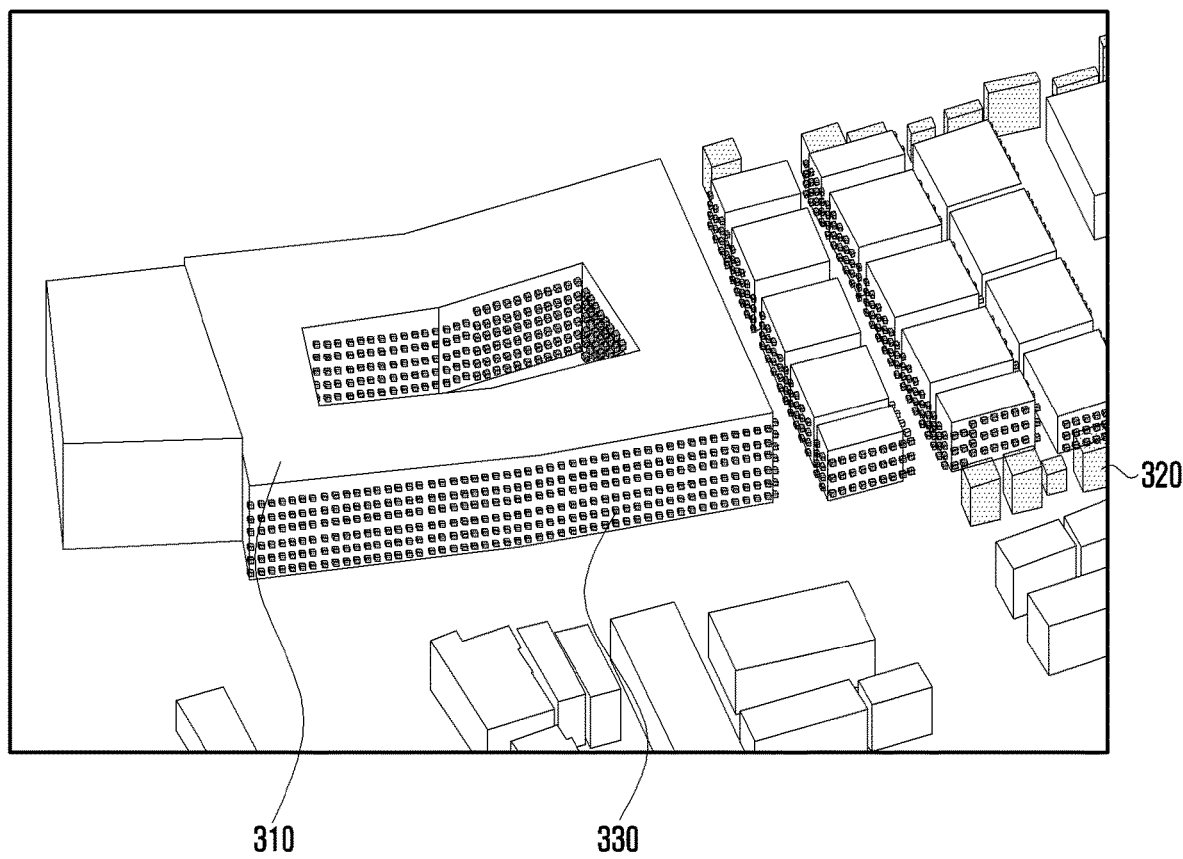

FIGS. 3A and 3B are diagrams for explaining a method for acquiring three-dimensional map information according to an embodiment of the present disclosure.

Referring to FIGS. 3A and 3B, it is possible to acquire three-dimensional map information based on real image information and location information corresponding to the image information of FIG. 3A. More specifically, the 3D map information of FIG. 3B may be acquired so that the ray tracing simulation may be performed based on the image information.

The map information obtained in FIG. 3B may include a building 310, a receiver candidate area 330, and a tree 320. As described above, by acquiring the map information, the transmitter location candidate and the receiver location candidate may be determined based on the acquired information. Therefore, the ray tracing simulation may be performed to determine at least one of the optimal transmitter location and receiver location.

In addition, in the embodiment, elements such as the building 310 may have properties of reflecting or scattering radio waves. In the case of such elements, more accurate simulation results may be obtained by considering surface materials and external shapes of the elements.

Also, in the embodiment, the tree 320 may transmit a radio wave, but the transmitted radio wave may experience signal attenuation greater than air. As such, more accurate simulation results may be obtained by considering radio wave transfer properties through objects such as the tree 320.

Also in the embodiment, the receiver candidate area 330 may be selectively performed according to the ray tracing, and may include an area in which a fixed or movable receiver may be installed. More specifically, a receiver is installed in a window area of the building 310, so that a receiver installed in the window area may serve as a relay in communication between another receiver in a building and a transmitter outside the building. As such, by performing the ray tracing simulation in consideration of the receiver candidate area 330, it is possible to obtain a result value considering better signal receiving environment.

Figure 4A:
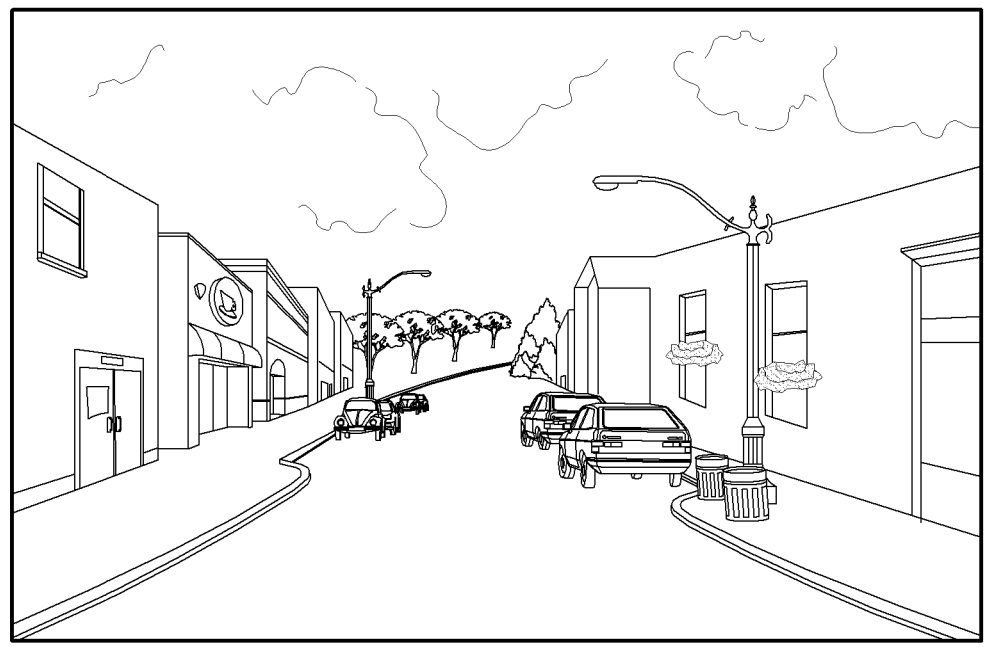
FIGS. 4A and 4B are diagrams for explaining a method of acquiring material information of an object in an image through image information according to an embodiment of the present disclosure.
Figure 4B:
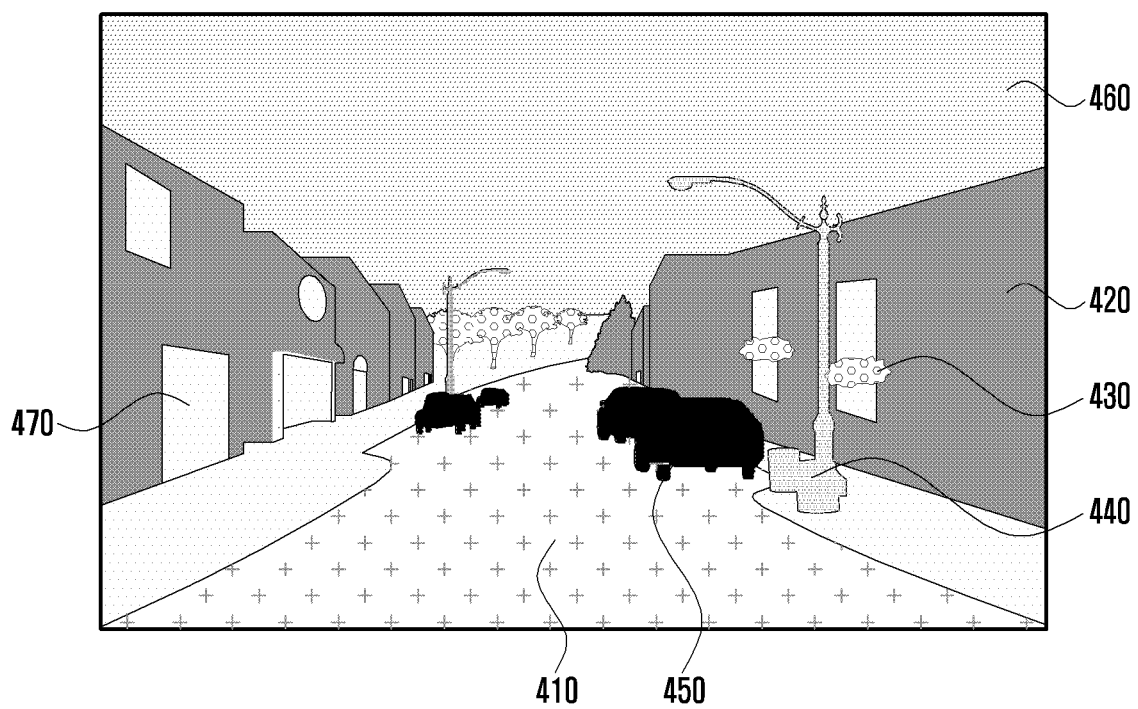

FIGS. 4A and 4B are diagrams for explaining a method of acquiring material information of an object in an image through image information according to an embodiment of the present disclosure.

Referring to FIGS. 4A and 4B, the material of the object displayed inside the image may be determined from the image information. More specifically, a material of an object in the image may be determined based on a deep learning-based computer vision technique in the image information. Features related to the more specific deep learning-based computer vision technique will be described later.

In the embodiment, the image information of FIG. 4A is analyzed to obtain the result of FIG. 4B. At this time, each element may be determined based on at least one of color, contrast, reflectance, mutual location relationship between the respective elements, and arrangement of the entire configuration elements of the image. In the embodiment, materials such as asphalt 410, concrete 420, plant 430, a steel structure 440, a vehicle 450, sky 460, glass 470, or the like may be determined based on the image analysis. As described above, the materials of the elements displayed in the image is determined based on the image information, and the properties of the materials are reflected on the ray tracing simulation to obtain more accurate results.

Figure 5:
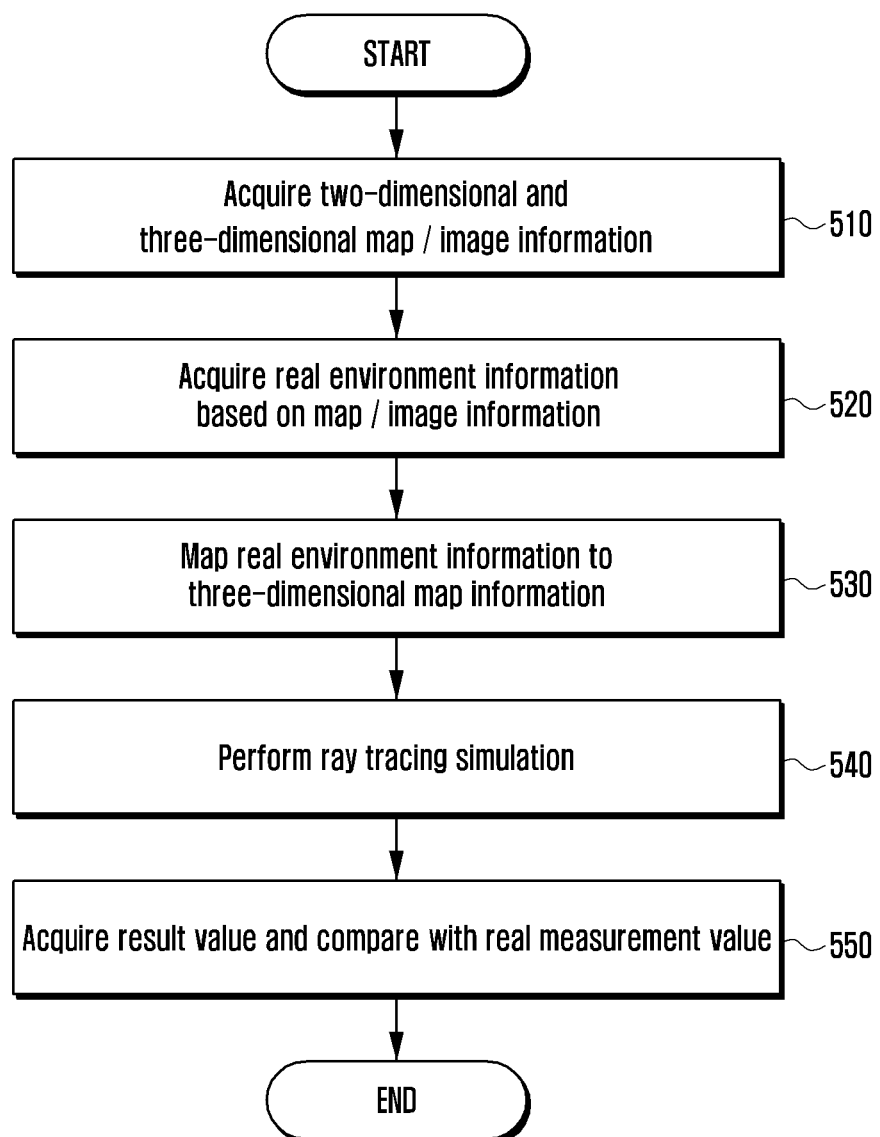
FIG. 5 is a diagram illustrating a method for analyzing communication channel environment based on ray tracing according to an embodiment of the present disclosure.

FIG. 5 is a diagram illustrating a method for analyzing communication channel environment based on ray tracing according to an embodiment of the present disclosure.

Referring to FIG. 5, a method for performing a ray tracing simulation is disclosed. In the embodiment, the ray tracing simulation may be performed in a computing device including a controller. The computing device may be a computing device including a central control processor, and may include a personal computer, a workstation, and the like. In the following embodiments, the simulation may be referred to as being performed by the computing device.

In operation 510, the computing device may obtain two-dimensional image information and three-dimensional map information. In the embodiment, the two-dimensional image information may include additional information corresponding to the image, and the additional information may include photographing information including location information, direction information, and angle of view information of the photographed image. Three-dimensional map information (hereinafter, referred to as map information) corresponding to two-dimensional image information may be determined based on the additional information. In addition, the three-dimensional map information may include location information and three-dimensional map information corresponding to the location information. Such information may include shape information of buildings, structures, and plants on an indicator or a water surface, and may include information related to at least one of a transmitter candidate location and a receiver candidate location according to the embodiment.

In the present disclosure, the two-dimensional image information may be described as image information. That is, the image information of the present disclosure may be configured in two dimensions. However, the embodiment of the present disclosure is not limited thereto, and the present disclosure may include embodiments in which image information is configured in three dimensions.

Similarly, in the present disclosure, the two-dimensional map information may be described as map information. That is, the map information of the present disclosure may be configured in three dimensions. However, the embodiment of the present disclosure is not limited thereto, and the present disclosure may include embodiments in which map information is configured in two dimensions.

In operation 520, the computing device may acquire real environment information based on at least one of the map information and the image information. The real environment information may include objects located on the communication path and properties of the objects. More specifically, it is possible to analyze the two-dimensional image information and determine properties of objects that may be located on the communication path based on the analyzed two-dimensional image information. The properties of the objects may include at least one of the material of the object surface and the external shape of the object, and in the case of an object capable of radio wave transmission, information related to the shape of the object and the signal attenuation upon the transmission may be included. Basically, information such as a type, a shape, a height, a breadth, and a width of the object may also be included in the real environment information. In the embodiment, real environment extraction may be performed based on the deep-running technique. More specifically, in the embodiment, if the computing device performs machine learning through a database including category information corresponding to an object to be extracted on a target image and inputs a target image based on the learning result, the computing device may extract the object on the target image and determine a category corresponding to the extracted object. More specifically, the real environmental entity affecting the propagation environment may include various obstacles, materials of an outer wall of a building and the like, in addition to foliage. In order to accurately predict the propagation path, at least one of type, a height, breadth, and width information of the propagation environment is extracted in addition to locations of obstacles affecting the propagation environment. Also, in order to automatically determine the installation location of the receiver and the transmitter, real environment entities such as a road, a street light, an installed rod, a rooftop, and a window may be extracted.

In operation 530, the computing device may map the real environment information of the communication path to the three-dimensional map information based on the information obtained in operations 510 and 520. When the real environment information is mapped to the three-dimensional map information, the additional information acquired through the two-dimensional image information may be mapped to an object corresponding to the three-dimensional map information based on the additional information included in the two-dimensional image information. In addition, in the embodiment, the computing device may construct (or generate) 3D map information reflecting the real environment based on the information of the object extracted in the operation 520. According to the embodiment, the computing device may map obstacles such as foliage and object information such as a pole and a rooftop to a commercial map, and the predicted material and the window may be matched to a 3D building form. The material information of the obstacles and the building may be categorized according to the influence on the propagation properties and may be parameterized through a lookup table and s mapping function and reflected on the ray tracing simulation later.

In operation 540, the computing device may perform the ray tracing simulation based on the information generated in the operation 530. In the embodiment, the ray tracing simulation may be performed by sequentially changing beam information in consideration of a beam in a specific direction, or may be performed under the assumption that beams in all directions that the transmitter may transmit are transmitted in the same time period. As a result of performing the ray tracing simulation, it is possible to predict and analyze a signal quality that the receiver can receive by reflecting a path through which the signal transmitted from the transmitter is received by the receiver and the real environment information located on the path. Also, when performing the ray tracing simulation in the embodiment, at least one of the transmission location and the reception location may be determined based on the three-dimensional map information, and the signal transmission environment may be determined based on the information mapped in operation 530.

In operation 550, the result value may be obtained based on the ray tracing simulation, and an additional ray tracing simulation may be performed based on the obtained result value and the value measured in the real environment. More specifically, when the simulation result value is compared with the real environment measurement value, if the compared values are different, the information obtained in operation 520 may be changed based on the real environment measurement value to generate the simulation result value again. In this way, the real environment information is reflected on the three-dimensional map to perform the ray tracing simulation, thereby performing the more reliable communication channel analysis. More specifically, it is possible to install the transmitter and the receiver in an area where the ray tracing simulation is performed and add or update basic information for carrying out the ray tracing simulation based on the result value that the signal transmitted from the transmitter is received by the receiver.

In this way, it is possible to determine at least one of an optimal transmitter location and receiver location for providing a wireless service to a specific area in the map based on the ray tracing simulation results. It is possible to effectively perform the network design by determining the optimal base station location as described above. More specifically, it is possible to determine an optimal base station location to effectively provide a wireless signal to a wireless terminal in a specific area. It is possible to provide an effective service even when a smaller number of base stations are arranged by determining the optimal base station location as described above.

In addition, the adaptive network management may be realized by reflecting the signal reception information measured in the real environment. More specifically, if the surrounding environment is changed after the transmitter is installed, additional ray tracing simulation may be performed considering the changed environment, and the network management such as adjusting the transmitter location by further reflecting the result value may be performed. In addition, such network management may also include changing the beam related information transmitted from the transmitter in addition to adjusting the transmitter location. More specifically, the transmitter may determine the transmission beam and the reception beam based on the ray tracing simulation result. In order to determine the transmission beam and the reception beam, beam alignment may be performed based on the ray tracing simulation result value. Such adaptive network management may be performed periodically.

Hereinafter, a method for identifying an object located on a communication path and real environment information, which is property information of the object will be described in detail.

Figure 6A:
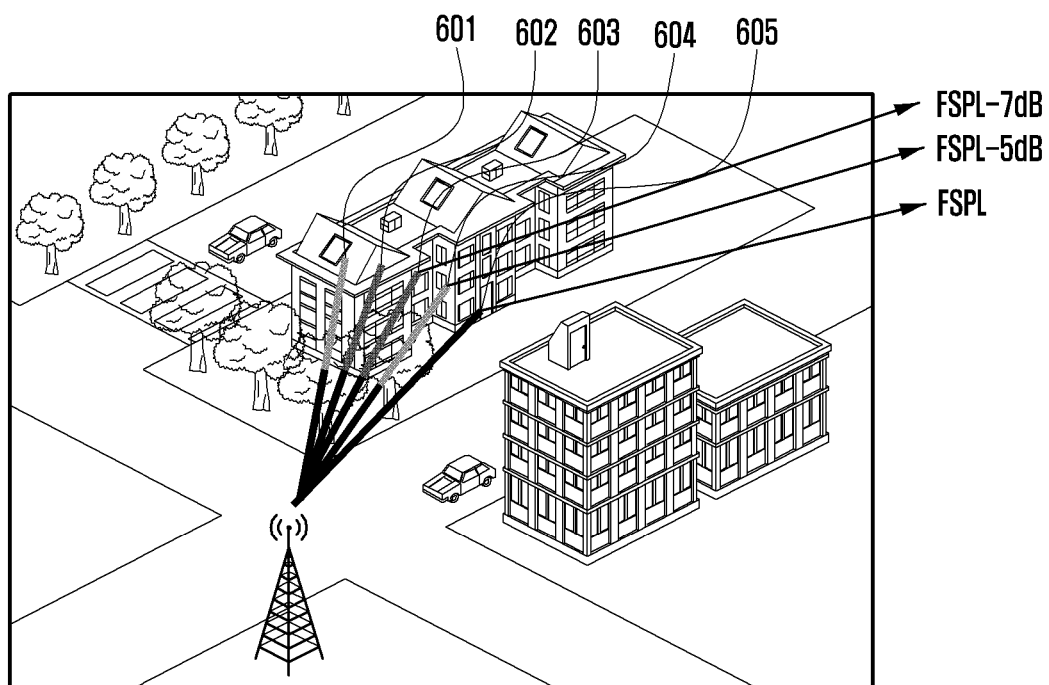
FIGS. 6A and 6B are diagrams illustrating an object located on a communication path and an influence of the object on a signal according to an embodiment of the present disclosure.
Figure 6B:
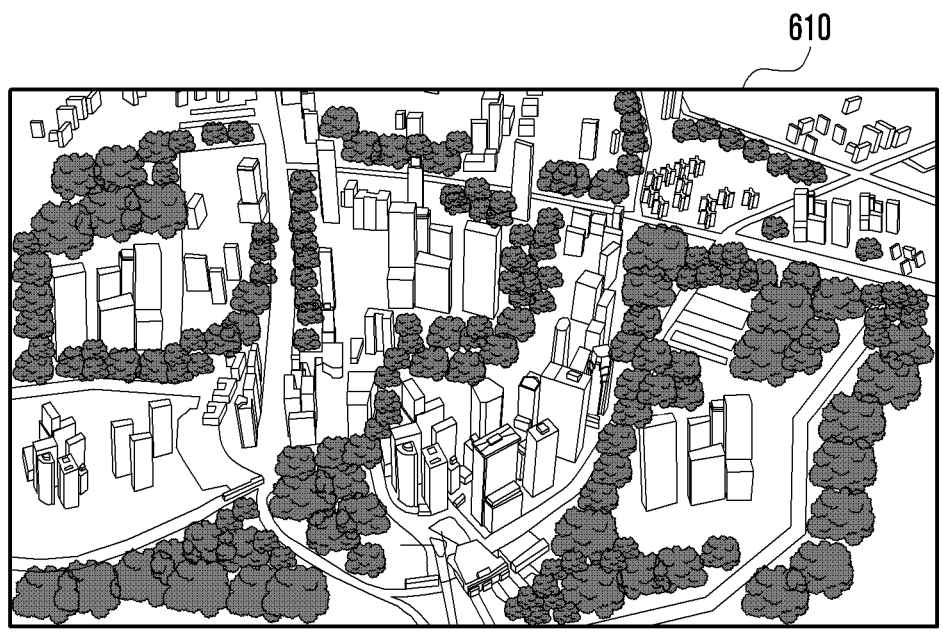

FIGS. 6A and 6B are diagrams illustrating an object located on a communication path and an influence of the object on a signal according to an embodiment of the present disclosure.

Referring to FIG. 6A, the signal that the transmitter transmits may be affected by an object located on a communication path which is a path through which the signal is transmitted. That is, the signal attenuation may occur by the object located on the communication path.

In the present disclosure, the object affecting the signal located on the communication path may be collectively referred to as an object or an obstacle. At this time, the type of objects located on the communication path may be classified according to their properties.

For example, an obstacle whose signal attenuation may occur while a radio wave is transmitted may be defined as a first type object. Alternatively, the first type object may be defined as an obstacle whose signal attenuation occurs due to at least one of diffraction, scattering, and absorption during the propagation or while the signal transmits the object. The first type object may include, for example, a tree, and may include other objects whose signal attenuation occurs as the radio wave is transmitted, scattered, diffracted or absorbed, in addition to the tree. Further, the first type object may be defined as parameters of some of the diffraction, scattering, or absorption. For example, the first type object of the present disclosure may be defined as an object whose signal attenuation occurs due to at least one of the scattering and absorption of the signal.

At this time, the first type object may be divided into a first part and a second part depending on the difference in magnitude of the signal attenuation. If the difference in the signal attenuation exceeds a threshold value, the first type object may be divided into a first part and a second part. Describing a tree by way of example, the difference between the magnitude in the signal attenuation at the foliage part and the magnitude in the signal attenuation of a trunk part may exceed the threshold value, and the foliage part may be differentiated as the first part and the trunk part may be differentiated as the second part. However, this is only an embodiment of the present disclosure, and the first type object may not be divided into the first part and the second part, or may be divided into more parts. For example, a tree without foliage may not have a part where the difference of the magnitude in the signal attenuation exceeds the threshold value, and the first part and the second part may not be differentiated from each other. In addition, an object other than the first type object may also be divided into a plurality of parts.

On the other hand, the obstacle whose signal attenuation occurs due to the reflection of the radio wave may be defined as a second type object. For example, the second type object may include a building, a streetlight, and the like.

In addition, various kinds may be defined according to the properties of the obstacle.

The present disclosure proposes a method for identifying property information of an object whose signal attenuation occurs due to at least one of transmission, scattering, diffraction, or absorption of a radio wave or a signal, and reflecting the identified property information on a simulation to increase accuracy of the simulation analyzing channel properties. As the accuracy of the simulation increases, it is possible to determine the optimal transmission (Tx) location upon the network design. An object whose signal attenuation occurs due to at least one of transmission, scattering, diffraction, or absorption of a radio wave is collectively referred to as an object. However, as described above, an object may be defined as only some parameters of transmission, scattering, diffraction, and absorption.

For example, the object of the present disclosure may refer to an object whose signal attenuation occurs due to at least one of scattering or absorption occurring due to transmission of a radio wave or a signal. Alternatively, the object of the present disclosure may refer to an object whose signal attenuation occurs due to at least one of transmission, scattering or absorption of a radio wave or a signal.

Alternatively, the object of the present disclosure may refer to an object in which at least one of transmittance, a scattering rate or an absorption rate of a radio wave or a signal is greater than a threshold value. Alternatively, the object of the present disclosure may refer to an object in which at least one of the scattering rate, the absorption rate, the diffraction rate of the radio wave or signal is greater than the threshold. Alternatively, the object of the present disclosure may refer to an object in which an absorption rate of a signal is greater than a threshold absorption value. Alternatively, the object may refer to an object whose diffraction rate of a signal is greater than a critical diffraction value, and may include the above two conditions. As described above, an object may be defined as only some parameters of the transmittance, the scattering rate, the absorption rate, and the diffraction rate.

Returning to the description of FIGS. 6A and 6B, various obstacles may be located between the transmitter and the receiver, and the signal that transmitter transmits may be attenuated by the object. However, the object may have different effects on the signal depending on the property information of the object. For example, even for the same object, the effect on the signal may be changed depending on the shape, size, and density of the object, and through which part of the object the signal passes.

Specifically, referring to FIG. 6A, it may be identified that a tree is located between the transmitter and the receiver. That is, in the present disclosure, an object may include, for example, a tree. At this time, it may be identified that a high signal attenuation (attenuation of 7 dB) occurs in signals 602 and 603 transmitting a part where density of foliage is high, whereas a low signal attenuation (attenuation of 5 dB) occurs in signals 601 and 604 transmitting a part where density of foliage is low, On the other hand, it may be identified that signal attenuation hardly occurs in a signal 605 that does not transmit an object. As described above, since an effect on the signal may be different according to the property information of the object, there is a need for a method for identifying detailed property information of an object.

However, the general map information used for the existing network design cannot identify the detailed property information of the object.

Referring to FIG. 6B, it may be identified that only information 610 on a degree of distribution of objects is included in the map information. That is, according to the related art, the property information of each object may not be identified using the map information, and only the distribution (shaded portion) of the object may be identified. Accordingly, the present disclosure provides a method for determining real environment information, which is property information of an object, by identifying detailed properties of the object based on at least one of map information and image information.

Figure 7:
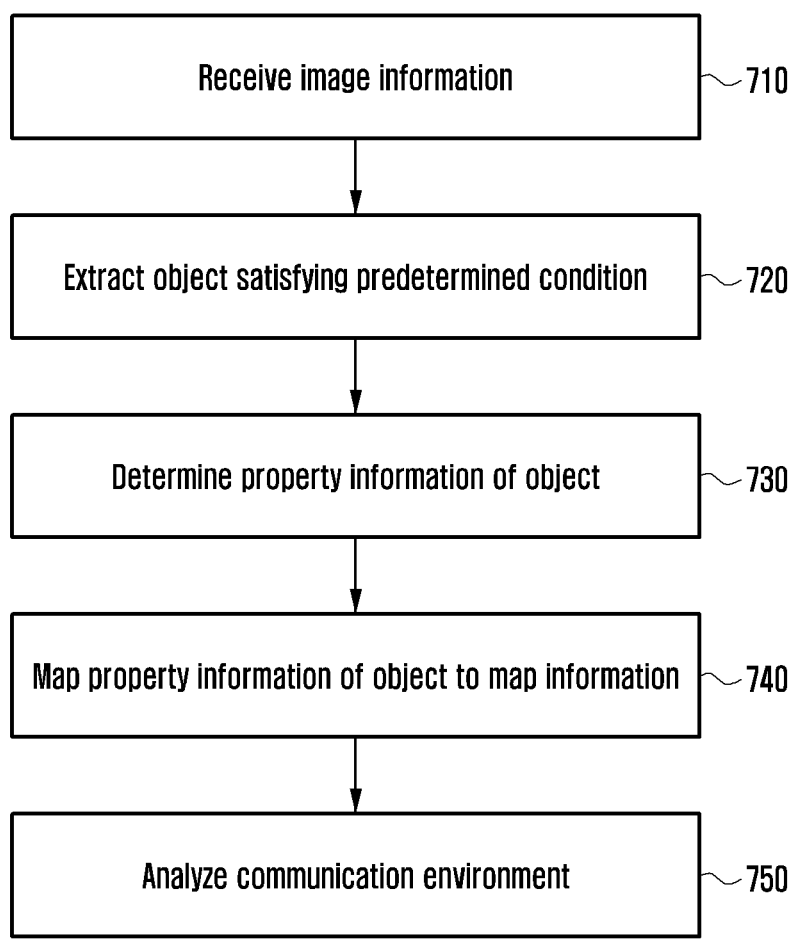
FIG. 7 is a diagram illustrating a method of confirming properties of an object located on a communication path according to an embodiment of the present disclosure.

FIG. 7 is a diagram illustrating a method of identifying properties of an object located on a communication path according to an embodiment of the present disclosure.

Referring to FIG. 7, the computing device may receive image information on arbitrary area in operation 710. As described above, the image information may include additional information, and the additional information may include photographing information including at least one of location information on a location, direction information, angle of view information, and pixel information of the photographed image.

Further, the computing device may receive the map information. The computing device may generate new map information by mapping the property information of the object obtained from the image information to the received map information. However, the timing when the map information is received is not limited to the operation 710, and the computing device may receive the map information before the operation 740 is performed. Further, the computing device may not receive the map information.

The computing device may extract the object in operation 720. At this time, the computing device may extract an object based on the received image information.

Specifically, the computing device may extract an object satisfying a predetermined condition, and in the present disclosure, an object satisfying predetermined conditions is preferably an object whose signal attenuation occurs due to at least one of transmission, absorption, diffraction, and scattering of a radio wave. However, the predetermined conditions of the present disclosure are not limited thereto. As described above, the object satisfying the predetermined conditions may refer to an object whose signal attenuation occurs due to at least one of transmission, absorption, diffraction, and scattering. In addition, the object satisfying the predetermined conditions may refer to the object in which at least one of the absorption rate, the transmittance, the scattering rate, and the diffraction rate of the radio wave exceeds a threshold value, or refer to the object in which at least one of the absorption rate, the scattering rate, and the diffraction rate exceeds the threshold value. For example, in the case of a tree, the signal attenuation due to the signal absorbing property or the diffraction property may appear the greatest. On the other hand, in the case of a building, the object satisfying the predetermined conditions may mean an object whose absorption rate of a signal is greater than a predetermined critical absorption rate because the absorption rate of the signal is relatively small. Also, the scattering rate and the transmittance may be applied in the same manner, and a case where two or more parameters exceed respective threshold values may be set as a condition. In this way, the predetermined conditions may be set according to the properties of the object to be extracted. For example, the object may cause attenuation of about 7 dB per meter (m).

Alternatively, the object satisfying the predetermined conditions of the present disclosure, such as determining the object whose signal attenuation occurs due to the reflection as the object that satisfies the predetermined conditions, may be determined under various conditions.

The computing device may identify the obstacles located on the communication path by type based on the image information. For example, an obstacle whose signal attenuation occurs due to at least one of the transmission, the scattering, the diffraction or the absorption of the signal, such as a tree may be determined as the first type object. Also, as described above, an object in which at least one of the transmittance, the absorption rate, the scattering rate, and the diffraction rate of the signal is greater than the threshold value may be determined as the first-type object.

In addition, an obstacle whose signal attenuation occurs due to the reflection of the signal, such as a building and a streetlight, may be classified as the second type object. Similarly, when the reflectance of the signal is greater than a predetermined threshold value, it may be classified as the second type object.

Also, a mobile object and an obstacle having mobility like a person may be classified as a third type object. However, if a moving speed is equal to or greater than the threshold value, the signal may not be affected. Accordingly, a method for classifying only an obstacle whose moving speed is equal to or less than a threshold value as a third type object is possible.

In addition, an obstacle capable of generating interference may be classified as a fourth type object. In addition, types may be classified according to properties of various obstacles located on a signal transmission path. In this case, the object satisfying the predetermined conditions may be determined as the first type object.

Therefore, the computing device may extract an object having the type whose properties are to be identified. At this time, at least one object may be included. That is, when there are a plurality of objects satisfying the predetermined conditions, the computing device may extract all the objects satisfying predetermined conditions through the image information and determine the properties of each of the objects.

In the present disclosure, a process of extracting a first type object with an object satisfying a predetermined condition and identifying the property information will be described, but as described above, the scope of the present disclosure is not limited thereto. That is, the computing device may extract the object of the second type to identify the property information. Further, the predetermined conditions may be changed by a user or may be changed according to the surrounding situations.

Further, the computing device may display the part where the extracted object is located on the image information. The computing device may display the part where the object is located on the image information and internally convert the area displayed on the image into data and use the data. The computing device may extract the property information of the object in operation 730. The property information of the object may include shape information, density information, size information, and the like of an object. Further, the size information may include width information, height information, and the like.

At this time, as described above, the object may be divided into two or more parts according to the degree of signal attenuation. As described above, when the difference in magnitude of the signal attenuation is greater than the threshold value, the object may be divided into the first part and the second part. In the present disclosure, a part where a magnitude in signal attenuation is large is defined as a first part. At this time, the computing device may divide the object into the first part and the second part by using deep learning. Accordingly, the computing device may divide an object into the first part and the second part, and analyze the properties of the first part and the properties of the second part, respectively. For example, the computing device may determine at least one of the shape information, the density information, and the size information of the first and second parts of the object. Alternatively, the computing device may identify some of the above-described information, or may additionally identify necessary information. In this case, the additionally necessary information may include information on the type of the object, or the like.

For example, in the case of a tree, the degree of transmission and absorption of signals in the foliage part may differ depending on the kind of the tree. Therefore, the computing device may identify the information on the type of object to determine the influence on the signal when analyzing the communication environment.

The computing device may map the property information of the object to the map information in operation 740. The computing apparatus may generate the three-dimensional map information reflecting the property information of the object.

The computing device may analyze the communication environment based on the generated map information in operation 750. Specifically, the computing device may perform the simulation using the map information, and may provide more accurate simulation results by performing the ray tracing simulation reflecting the properties of the object as described above. Further, it is possible to realize the effective network design by setting the optimal location of at least one transmitter by using this and determining the ray satisfying the set criterion among the rays corresponding to the transmitter.

Figure 8:
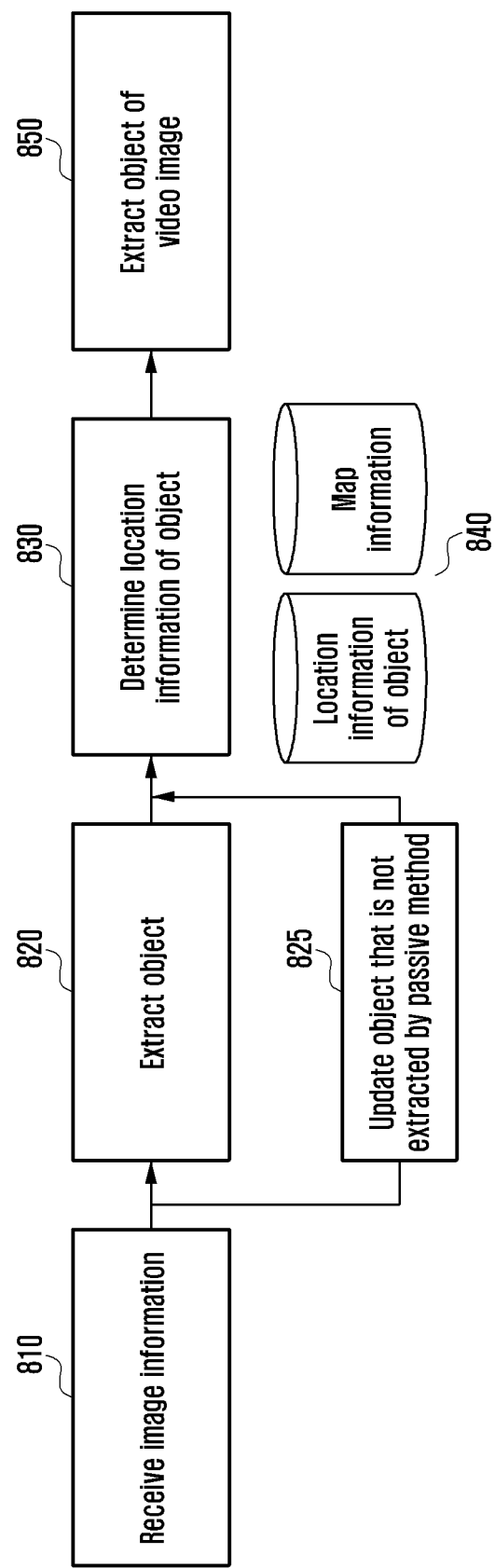
FIG. 8 is a diagram illustrating a detailed method of extracting an object located on a communication path according to an embodiment of the present disclosure.

FIG. 8 is a diagram illustrating a detailed method of extracting an object located on a communication path according to an embodiment of the present disclosure.

Referring to FIG. 8, the computing device may receive image information in operation 810. This is the same as operation 710, and is omitted below.

The computing device may extract the object in operation 820. The computing device may classify the information included in the image based on the deep learning based computer vision technique and extract the object satisfying the predetermined condition among them. The deep learning is a technique if inputting a lot of data and classify similar things. Therefore, the computing device may label the image information through the deep learning data to classify things included in the image information, and extract an object to identify the property information among them. As described above, the computing device may classify various kinds of obstacles in the image information, and it is possible to identify the object satisfying the predetermined conditions among them.

Also, if there is an object that is not be extracted through the image information, the object that is not extracted through the passive method may be updated in operation 825. At this time, the user may manually update the object that is included in the image but is not be extracted.

The computing device may extract the location information of each object in operation 830. As described above, the image information may include photographing information such as location information, direction information, angle of view information, and pixel information of the photographed. Accordingly, the computing device may determine the location information of the object included in the image information using the photographing information.

At this time, the following method may be used to determine the location information of the object.

The computing device may use the image information photographed at different places. Specifically, the computing device may use latitude and longitude information, angle information, pixel information, and the like included in the image information. The computing device may calculate the direction information and the angle information for one object at different locations through the image information photographed at different locations using the information. In addition, the location information on the object may be calculated by using the direction information and the angle information for one object at, at least three locations. At this time, the location information of the object may include the latitude information and the longitude information of the place where the object is located.

The computing device repeats the above process to identify the location information of each object. The computing device may store the location information of each object in a database (DB).

The computing device may map the location information of the map information in operation 840.

Next, the computing device may extract the object of the image in operation 850.

Figure 9A:
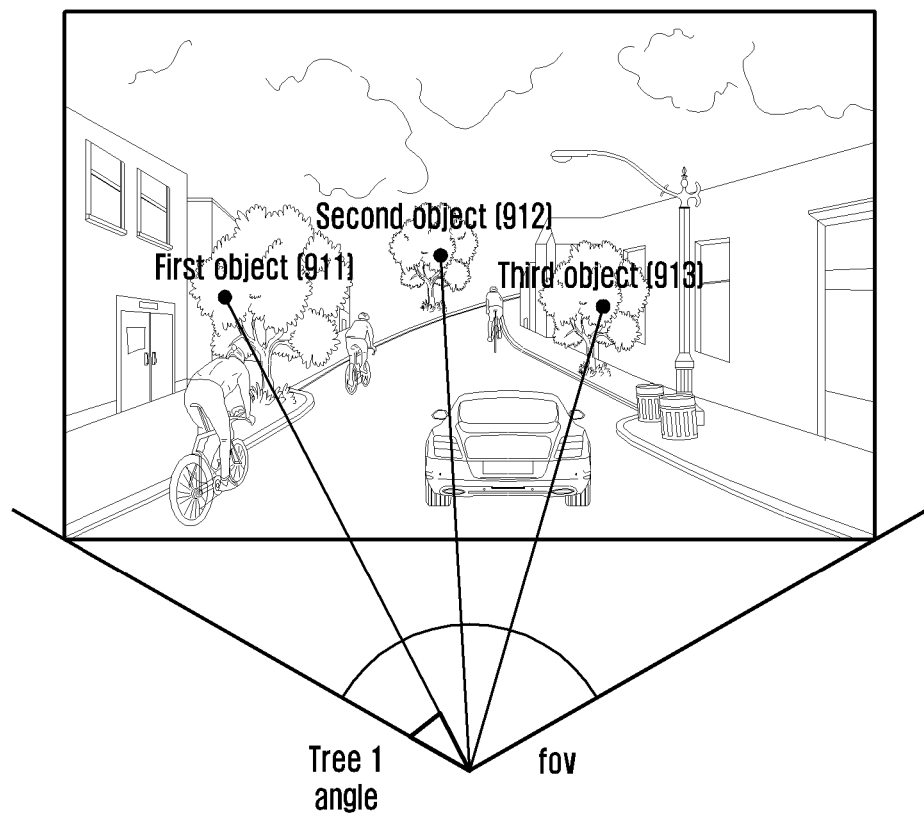
FIGS. 9A, 9B, and 9C are diagrams illustrating a method of extracting an object located on a communication path according to another embodiment of the present disclosure.
Figure 9B:
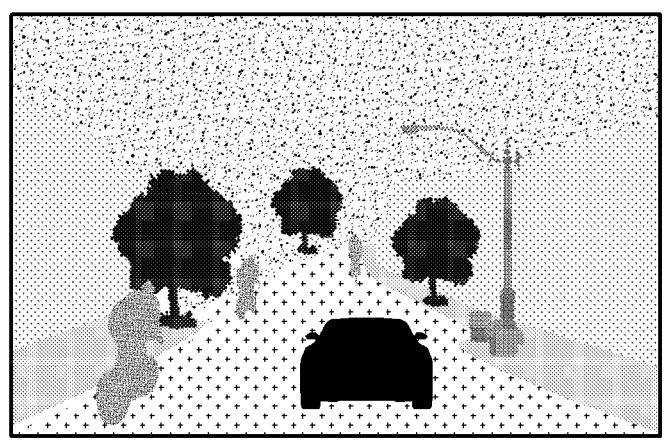
Figure 9C:
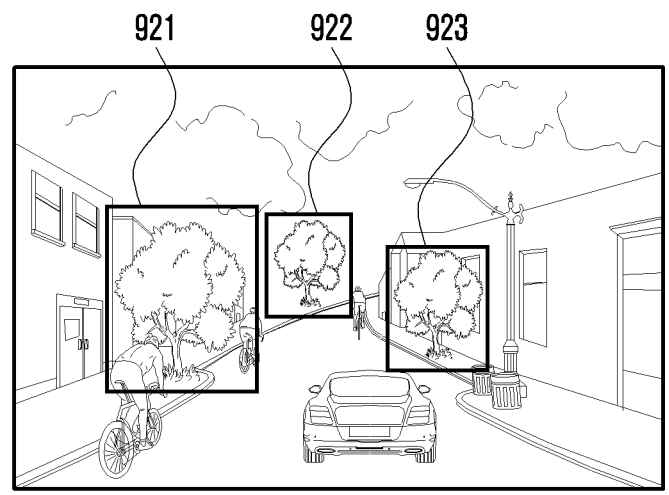

FIGS. 9A, 9B, and 9C are diagrams illustrating a method of extracting an object located on a communication path according to another embodiment of the present disclosure.

Referring to FIG. 9A, the image information that the computing device receives is illustrated. In FIG. 9A, a method of extracting a tree as an example of an object located on a communication path is described.

The image information includes a first object 911, a second object 912, and a third object 913. A method for extracting, by a computing device, a first object 911, a second object 912, and a third object 913 included in image information will be described. In addition, it may be identified that the image information 910 includes location information, direction information, angle of view information, pixel information, and the like of the photographed image.

The computing device may classify various types of objects included in the image information by using the deep learning.

Referring to FIG. 9B, obstacles classified by the deep learning are illustrated. An object classified by the same pattern by the deep learning may be included in the same type. It may be identified that trees, vehicles, people, roads, and signs are classified into different types of objects. In addition, it may be identified that trees are classified as the same type of objects. However, the method illustrated in FIG. 9B is merely an example of a method for classifying objects by deep learning, and the computing device may perform the deep learning by various methods. For example, a method in which a person and a vehicle are classified as the same type as an object having mobility is also possible.

Referring to FIG. 9C, a situation where an object satisfying a predetermined condition as a result of the deep learning is identified. The computing device may identify the object by the deep learning and may display (921, 922, 923) the identified object on the image. The computing device may identify the location information of the identified object.

As illustrated in FIG. 9A, the computing device may identify orientation information between the first object 911, the second object 912, and the third object 913 using the photographing information, and identify the location information using the identified orientation information.

In addition, the computing device may identify the property information of each object. Therefore, the property information of the object may be mapped to the map information by using the location information of the object.

A method for identifying properties of an object will be described.

Figure 10:
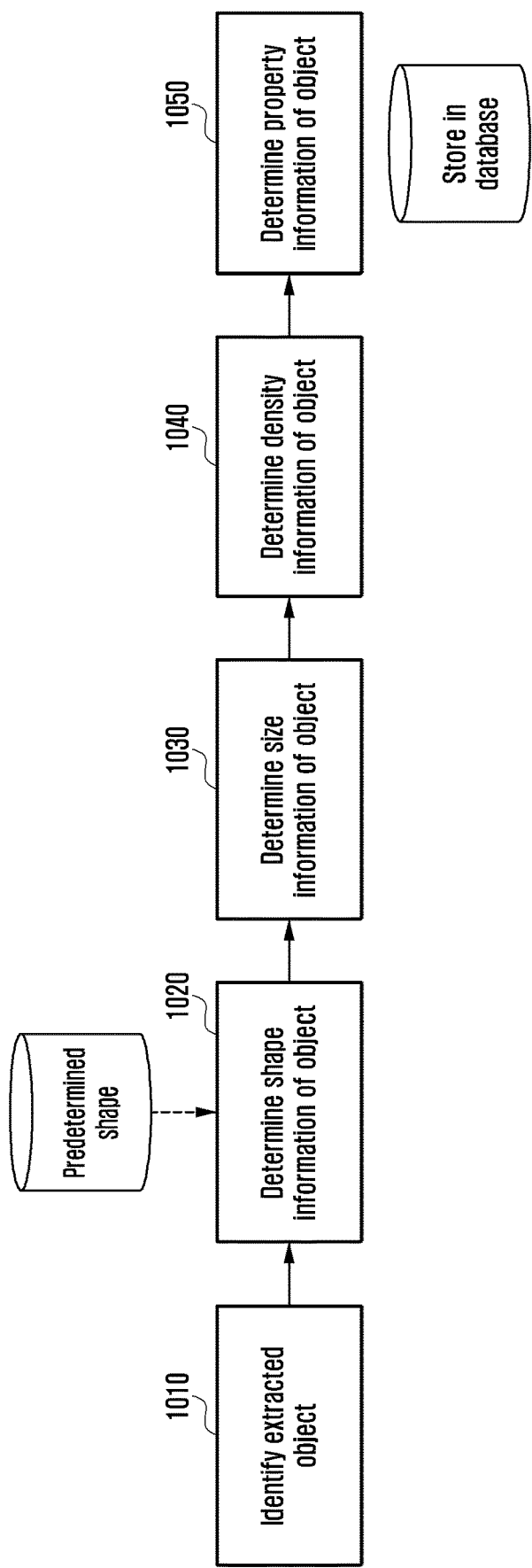
FIG. 10 is a diagram illustrating a method for determining property information of an object according to an embodiment of the present disclosure.

FIG. 10 is a diagram illustrating a method for determining property information of an object according to an embodiment of the present disclosure.

Referring to FIG. 10, the computing device may identify the extracted object in operation 1010.

The computing device may determine the shape information of the object in operation 1020. The computing device may use computer vision to identify a shape along an edge of an object and classify shapes by analyzing predefined shapes or predefined shapes and similarities.

Further, when the object is divided into the first part and the second part, the computing device may identify the shapes of the first part and the second part, respectively, or identify the shape of only one part. In this case, the first part of the object may mean a part where the magnitude in the signal attenuation is large as described above.

For example, if the object is a tree, the first part in which the magnitude in the signal attenuation is large may correspond to the foliage portion, and the computing device may classify the shape of the foliage part. At this time, the predefined shape may include, for example, a triangle, a circle, a square, an inverted triangle, and the like, and the computing device may identify the shape of the foliage portion.

On the other hand, the computing device may not check the shape of the trunk which is the second part. In the case of the tree, the shapes of the trunk parts are similar, so that the effect of the signal attenuation is hardly changed due to the shape difference. Alternatively, in the case of the tree, since the shapes of the trunks are almost similar, the computing device may use a predetermined shape.

The computing device may determine the size information of the object in operation 1030.

The computing device may identify size information of an object using another object included in the image information. The size information may include height information and width information. The computing device may determine the size information of the object using height information or width information of another object, and in the present disclosure, the size information of another object is referred to as reference information.

For example, the reference information may include height information of a building located around an object, width information of a mobile object (e.g., car), and the like.

The computing device may store the height information of the building, the width information of the mobile object, and the like. Accordingly, the computing device may determine the size information of the object using the reference information and the size ratio of the object. Alternatively, the computing device may calculate a length per pixel of the image information using the reference information, and may identify the height information and the width information of the first part and the second part based on the calculation result.

For example, if a width of one mobile object is 3 m and a pixel area occupied by the image information is 600 px, a length of a width per 1 px may be identified to be 0.5 cm. Accordingly, the computing device may calculate the width information of the object by multiplying the number of pixels occupied by the width of the object by 0.5. The detailed method will be described below.

Further, if the object is divided into the first part and the second part, the computing device may determine the size information for each of the first and second parts.

The computing device may determine the density information of the object in operation 1040.

The computing device may determine the density information using the computer vision. For example, the computing device may divide density information into three levels, such as density, mid-density, and low-density sparse. The computing device may determine the type information of the object to determine the density information. The computing device may identify the type of each object by utilizing the learning data by the deep learning method. The computing device may determine the density information based on the type information of the object.

For example, if the object is a tree, the computing device may identify the type of trees by the deep learning. For example, a tree may be divided into conifers, hardwoods, and others. Further, the computing device may determine the conifer as sparse, the others as mid, and the hardwood as density according to the kind of trees.

In addition, the type information of the object may also be used for the simulation as the property information of the object. For example, it is possible to digitize the degree of scattering, the degree of absorption, and the degree of transmission according to the type of object, and reflect the digitized information on the map information to be used for the simulation. At this time, the computing device may digitize at least one of the degree of scattering, the degree of absorption, and the degree of transmission according to the type of the object, and reflect the digitized information on the map information.

Further, when the object is divided into the first part and the second part, the computing device may determine the density information of the first part and the second part, respectively, or may determine only the density information of any one portion.

For example, if the object is a tree, the computing device may determine the density information of the foliage part which is the first part.

On the other hand, the density information of the second part which is the trunk, has little influence on the signal, so the density information may not be determined for the second part.

However, the embodiment of the present disclosure is not limited thereto. That is, the density information may be classified into three or more states depending on the situation. Also, in the density information, the density of a center part and a peripheral part of the object may also be determined differently depending on the shape information.

Then, in operation 1050, the computing device repeats the above process for the object included in the image information to determine the property information of each object, and stores the determined property information in the database.

Also, the computing device may map the property information of the obtained object to the map information and use the mapped information for the simulation, and determine the optimal Tx position according to the simulation result.

However, in the present disclosure, the computing device may determine at least one of the shape information, the size information, and the density information in the process of determining characteristic information of an object. For example, when the density information is not calculated, the computing device maps only the shape information and the size information to the map information and may use the mapped information for the simulation.

Figure 11:
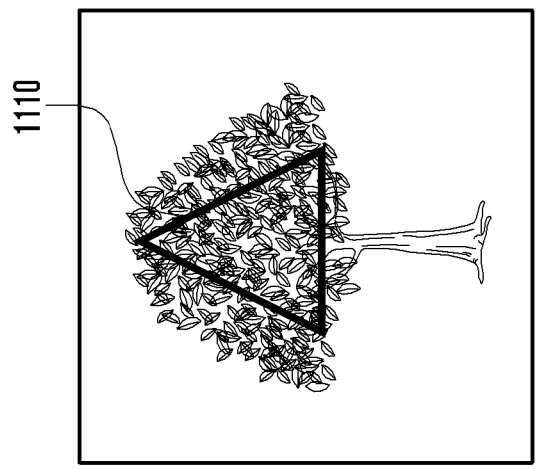
FIG. 11 is a diagram illustrating a detailed method for identifying shape information of an object according to an embodiment of the present disclosure.
Figure 11:
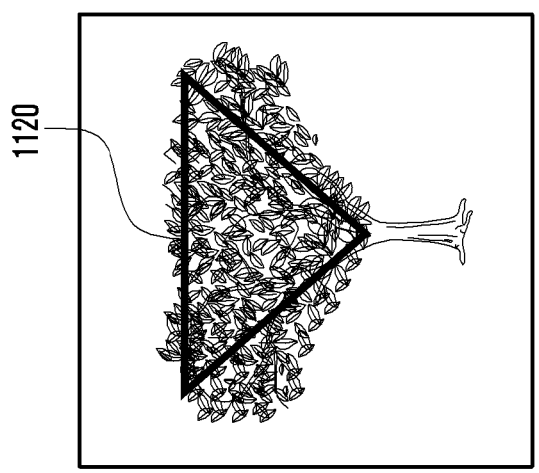
Figure 11:
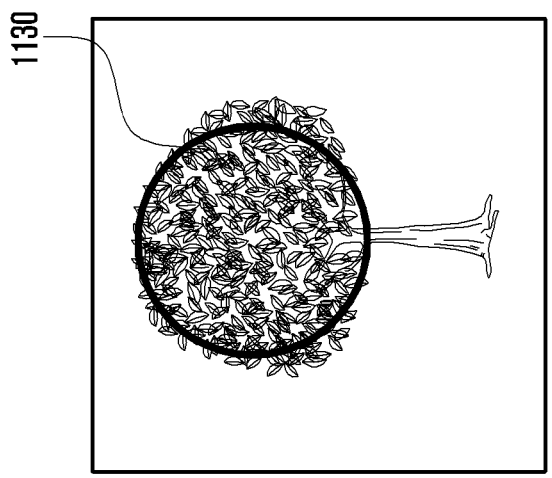
Figure 11:
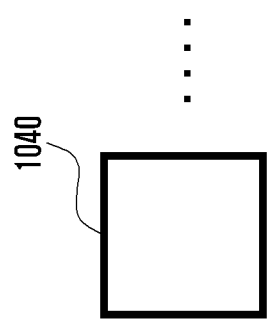

FIG. 11 is a diagram illustrating a specific method for identifying shape information of an object according to an embodiment of the present disclosure.

As described above, the computing device may identify the shape along the edge of the first part using the computer vision, and analyze the predefined shape and similarity. Further, when the object is divided into the first part and the second part, the computing device may identify the shapes of the first part and the second part, respectively, or may determine the shape only for any one part. In FIG. 10, an example of identifying the shape of the second part will be described.

Referring to FIG. 11, the predefined shape may include a triangle 1110, an inverted triangle 1120, a circle 1130, a rectangle 1140, and the like. Accordingly, the computing device can identify whether the shape of the edge of the first part of the object is most similar to any of the predefined shapes triangle, inverted triangle, circle, or rectangle.

However, the predefined shape is not limited thereto. That is, another shape may be added to the predefined shape, or a part of the shape described above may be deleted.

If the similarity does not exceed the threshold value as a result of the similarity determination, the computing device may add the shape of the first part as a new shape.

Figure 12A:
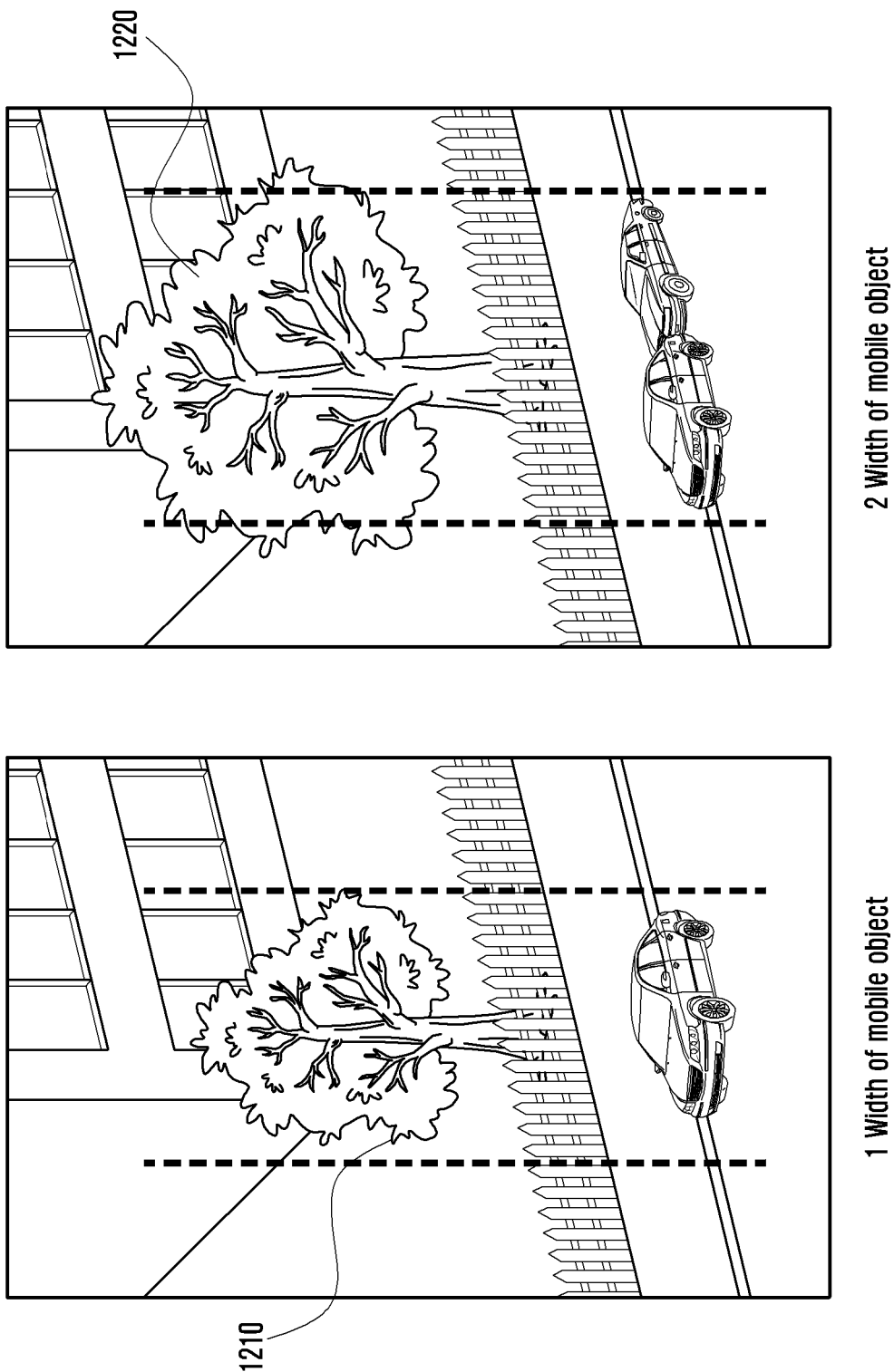
FIGS. 12A and 12B are diagrams illustrating a method for identifying size information of an object according to an embodiment of the present disclosure.
Figure 12B:
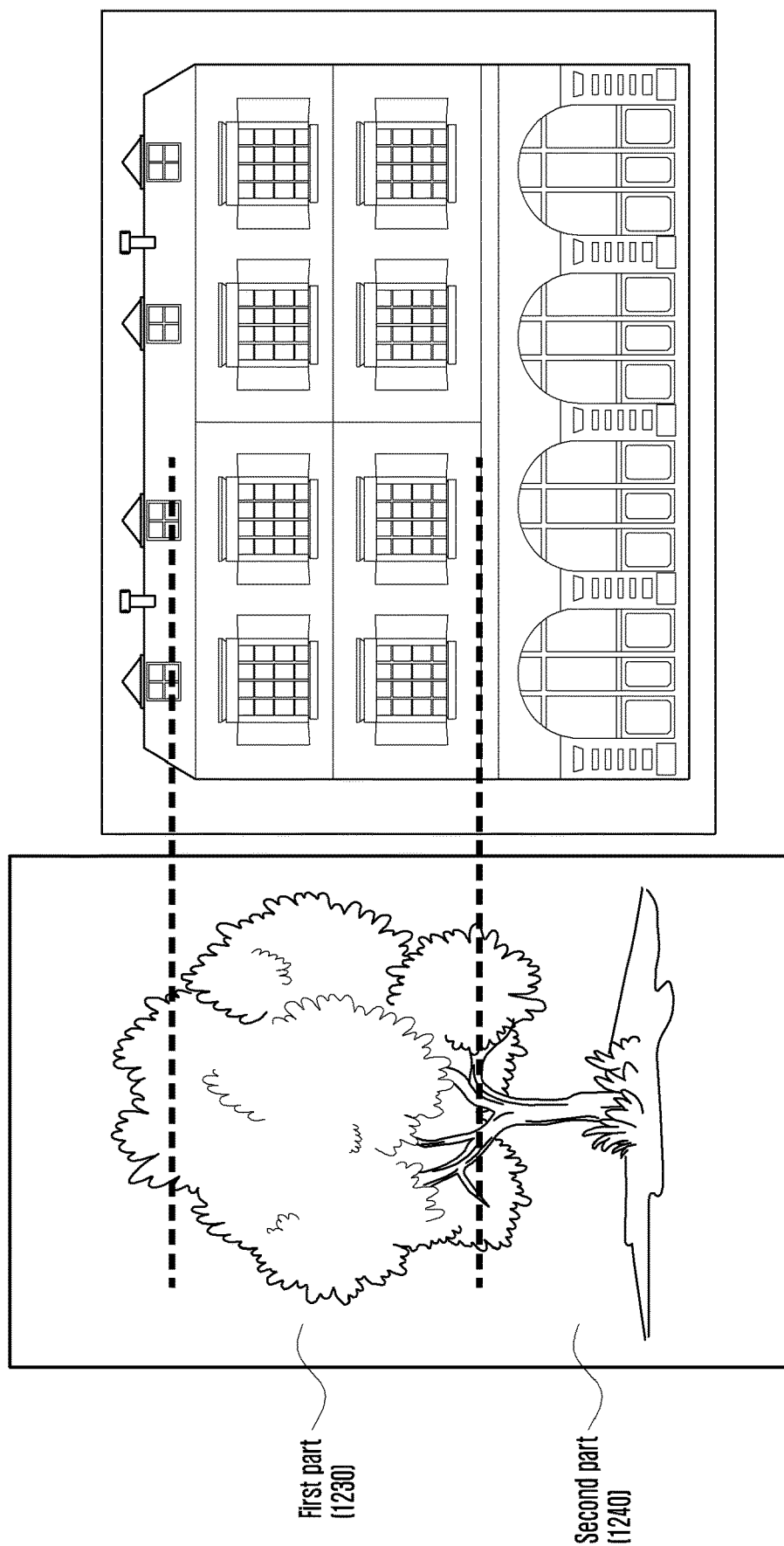

FIGS. 12A and 12B are diagrams illustrating a method for identifying size information of an object according to an embodiment of the present disclosure.

Referring to FIG. 12A, a method for determining width information of an object is illustrated. The computing device may determine the width information of the object by using the information of objects located on the vicinity of the object. For example, the computing device may determine the width information of the object using the width information of the mobile object.

Further, when the object is divided into the first part and the second part, the computing device may identify the width of the first part and the second part, respectively or may determine a width only for any one part thereof. Although FIG. 12A shows a method of determining a width of a first part, it is possible to determine the width of the second part based on the determined width.

At this time, the computing device may store the width information according to the mobile object. Alternatively, the width information of the mobile object may be identified using the information included in the image information. Therefore, the computing device may determine the width information of the object by comparing the width of the mobile object with the width of the object as in FIG. 12A.

When the width of the mobile object is 3 m, in the case of an object 1210, since a width of one mobile object is similar to a width of the first part, the width of the object 1210 may be determined to be 3 m. Further, in the case of the object 1220, since the width of the two mobile objects and the width of the first part are similar to each other, the width of the object 1220 may be determined to be 6 m. However, the lengths of the two mobile objects may be different, and in this case, the sum of the lengths of the mobile object may be used.

When the widths of the mobile object and the object do not coincide with each other, the computing device may determine the width information of the object by using the ratio of the width of the mobile object and the width of the object. Also, the computing device may determine the width information of the object using the pixel information of the image information as described above.

For example, if a width of one mobile object is 3 m and a pixel area occupied by the image information is 600 px, a length of a width per 1 px may be identified to be 0.5 cm. When the pixel area occupied by the width of the object is 800 px, the computing device may calculate the width information of the object as 4 m by multiplying the number of pixels occupied by the width of the object by 0.5.

Referring to FIG. 12B, a method for determining height information of an object is illustrated. The computing device may determine the height information of the object by using the information of objects located on the vicinity of the object. For example, the computing device may determine the width information of the object using the height information of the building.

Further, when the object is divided into the first part and the second part, the computing device may identify the width of the first part and the second part, respectively or may determine a height only for any one part thereof. In FIG. 12B, a method for determining heights of a first part and a second part, respectively, will be described.

At this time, the computing device may store information about the height of the building around the object. Alternatively, the computing device may identify the height information of the building using the information included in the image information. Therefore, the computing device may determine the height of the object by comparing the height of the building with the height of the object as in FIG. 12B.

If the height of the first floor of the building is 2 m and the height of the first floor to the second floor is 3 m, the height of the first part 1230 of the object may be calculated to be 2 m and the height of the second part 1240 may be calculated to be 3 m.

When the height of the building does not match the height of the object, the computing device may determine the height information of the object using the ratio of the height of the building to the height of the object. Also, the computing device may determine the height information of the object using the pixel information of the image information as described above.

For example, if the height of the building is 10 m and the pixel area occupied by the image information is 1000 px, a length of a height per 1 px may be identified to be 1 cm. When the pixel area occupied by the height of the object is 800 px, the computing device may calculate the height information of the object as 8 m by multiplying the number of pixels occupied by the height of the object by 1.

At this time, as the height information of the object, the height information of the first part and the height information of the second part may each be determined. In this case, the computing device can determine the height information of each part by checking the pixel area occupied by the first part and the pixel area occupied by the second part, respectively.

Figure 13:
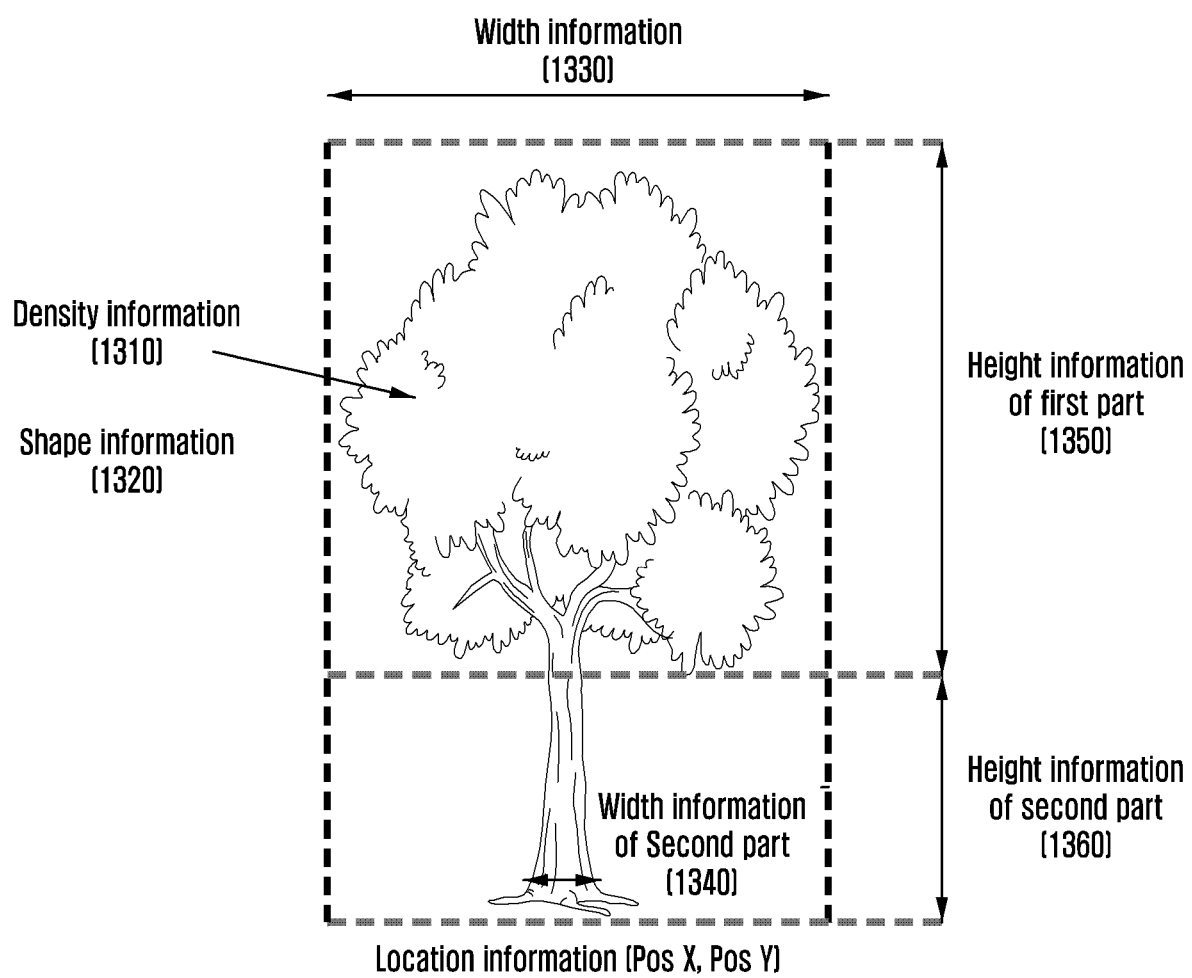
FIG. 13 is a diagram illustrating property information determined according to an embodiment of the present disclosure.

FIG. 13 is a diagram illustrating property information determined according to an embodiment of the present disclosure.

Referring to FIG. 13, an object can be divided into a first part and a second part.

The property information may include density information 1310 and shape information 1320 on the type of the object. In this case, the shape information 1320 may mean the shape information of the first part.

The property information may include width information 1330 of the first part, width information 1340 of the second part, height information 1350 of the first part, and height information 1360 of the second part.

In addition, the property information may include location information in the form of coordinates.

Figure 14A:
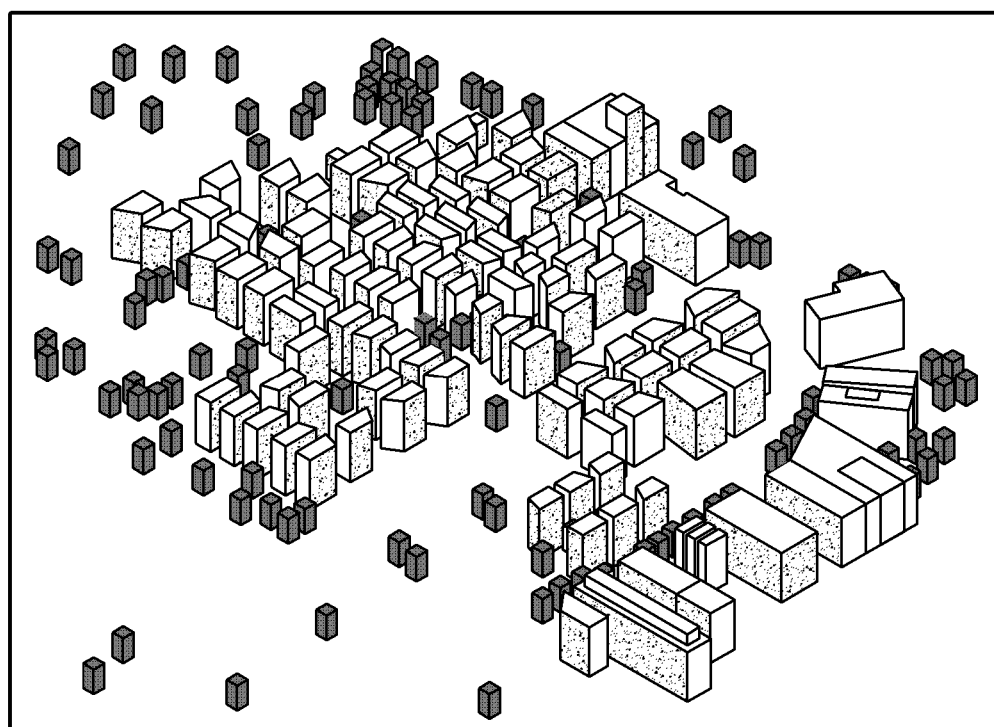
FIGS. 14A and 14B are diagrams illustrating a result of reflecting property information of an object on three-dimensional map information according to an embodiment of the present disclosure.
Figure 14B:
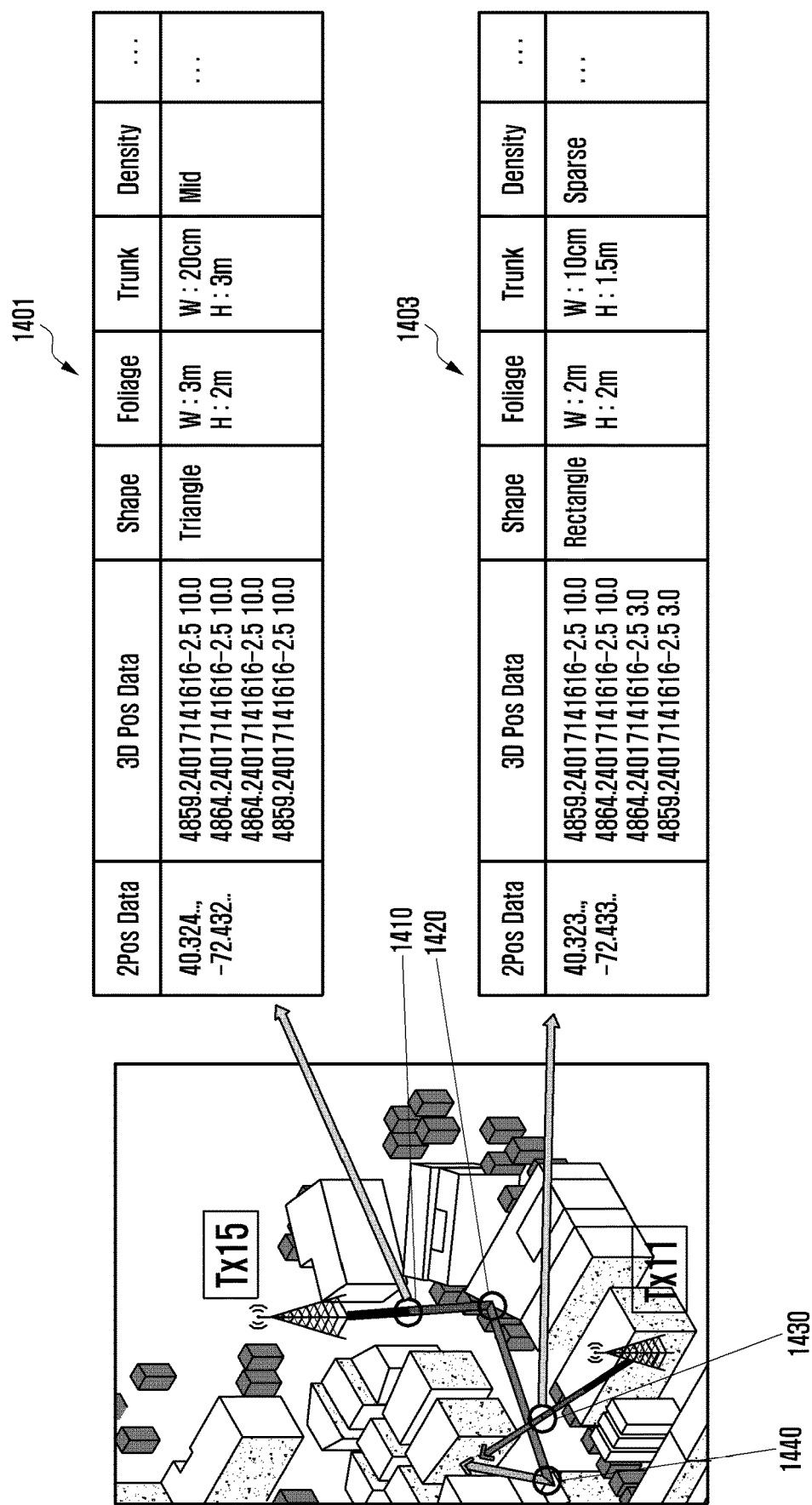

FIGS. 14A and 14B are diagrams illustrating a result of reflecting property information of an object on three-dimensional map information according to an embodiment of the present disclosure.

Referring to FIG. 14A, it can be seen that the map information generated according to the present disclosure reflects not only the degree of distribution of objects but also the detailed properties of each object. For example, if the object is a tree, locations of each tree may be represented and detailed property information of each tree may be included, unlike the existing map information showing only the distribution of the tree. Therefore, the detailed property information may be reflected to the simulation at the location of each tree.

Referring to FIG. 14B, a method for performing simulation by reflecting properties of each object is illustrated.

The computing device can use property information 1401 of a first object 1410 and property information 1403 of a second object 1430 during the simulation process.

Specifically, referring to FIG. 14B, intensity of a signal transmitted from the transmitter 15 may be reduced while the signal passing through the first object 1410. At this time, the degree of decrease of the intensity of the signal may be determined according to the property information of the first object 1410. Further, the intensity of the signal may more be reduced while the signal is reflected from building 1 1420. At this time, the degree of decrease in the intensity of the signal due to the reflection may be determined according to the material of the building, or the like. Further, the intensity of the signal may more be reduced while the signal passes through the second object 1430. At this time, the degree of decrease in the intensity of the signal may be determined according to the property information of the second object 1430. In addition, the signal may reach the receiver while the intensity of the signal is more reduced due to the reflection of the signal from the building 2 1440.

For example, the magnitude in the signal attenuation measured at the receiver may be measured at −50 dB when the first and second objects are not taken into consideration. However, the magnitude in the signal attenuation is measured at −70 dB by considering the first and second objects. As a result, it is possible to more accurately enable the detailed simulation.

On the other hand, if the signal transmitted from the transmitter 11 passes through the second object 1440, the intensity of the signal may be decreased.

For example, the signal attenuation may be uniformly measured at −10 dB in the existing method that knows only the presence of the second object, but when the simulation is performed by reflecting the property information of the object, the signal attenuation is measured at −20 dB to enable the detailed simulation.

Also, the signal transmitted from the transmitter 15 and the signal transmitted from the transmitter 11 may pass through different parts of the second object 1440, and the reduction degree of the intensity of the signal may be reflected differently depending on the property information of the object.

In this way, the accuracy of the simulation result may be improved by performing the simulation reflecting the properties of the object.

Figure 15A:
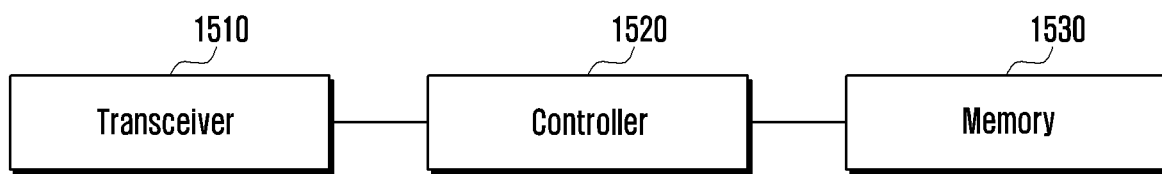
FIG. 15A is a diagram illustrating a computing device according to another embodiment of the present disclosure.

FIG. 15A is a diagram illustrating a computing device according to the embodiment of the present disclosure.

Referring to FIG. 15A, the computing device may include a transceiver 1510, a controller 1520, and a memory 1530. In the present disclosure, the controller may be defined as a circuit, an application specific integrated circuit, or at least one processor.

The transceiver 1510 may transmit and receive a signal to and from devices outside the computing device. More specifically, transceiver 1510 can transmit/receive data to/from an external device. To this end, an interface for the transmission and reception may be provided.

The controller 1520 may control the operation of the computing device, and may control the computing device as a whole to perform operations related to the computing device described in the above embodiments. The controller 1520 may include at least one processor. Further, the processor may be controlled by a program including instructions that execute the methods described in the embodiments of the present specification. In addition, the program may also be stored in a storage medium, which may include a computer readable storage medium storing computer program codes. In addition, the storage medium may include a volatile or non-volatile memory. The memory may be a medium capable of storing data, and the form thereof is not limited as long as it stores the instructions.

The memory 1530 may store at least one of the information associated with the computing device and the information transmitted and received through the transceiver 1510. Further, it is possible to store all the information necessary for the simulation in the embodiment of the present disclosure, such as the property information and the location information of the object. In addition, the information stored in the memory 1530 may be added, deleted, and updated based on at least one of the simulation result and the comparison result.

Figure 15B:
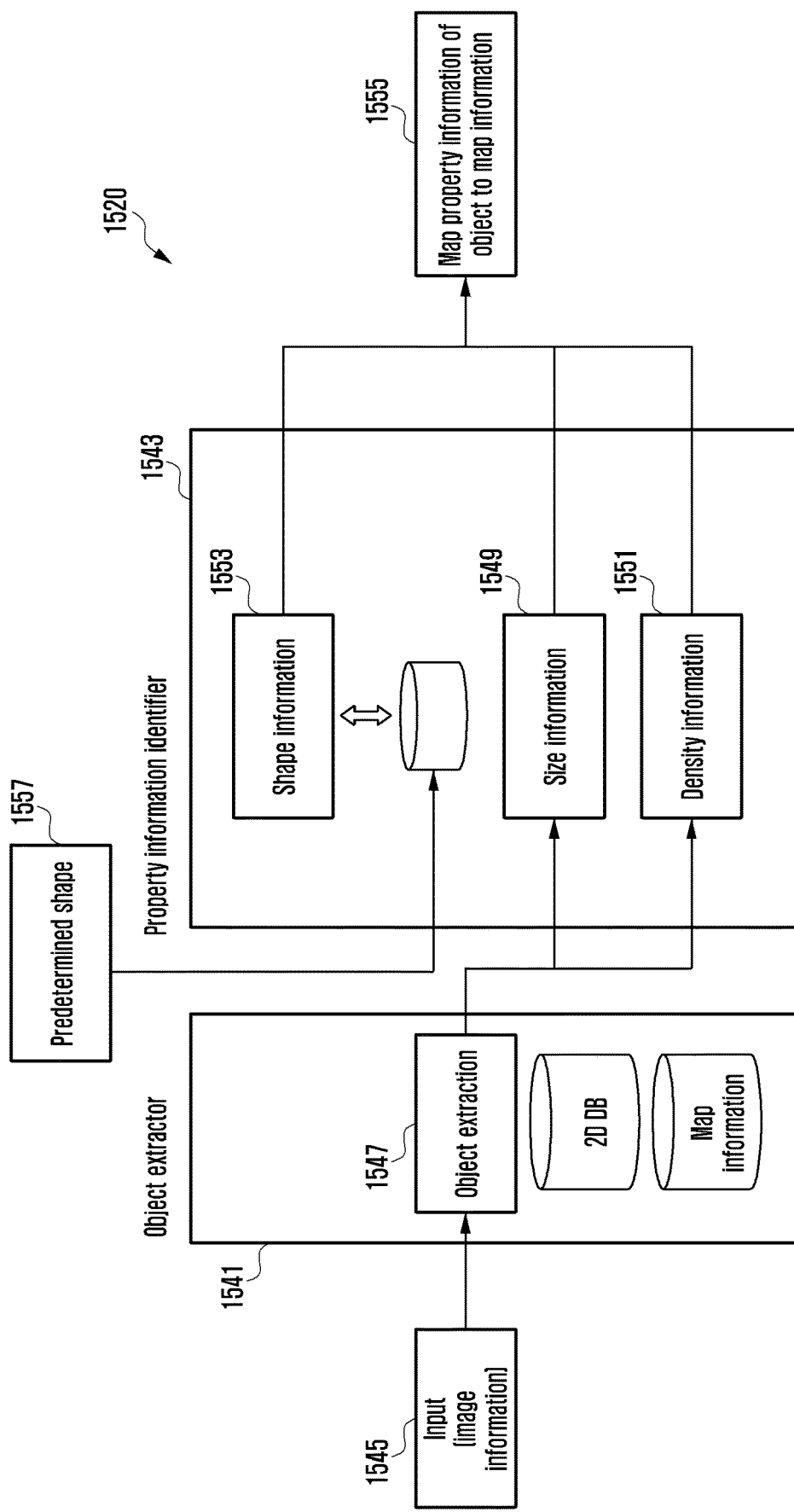
FIG. 15B is a diagram illustrating a configuration of a controller according to an embodiment of the present disclosure.

FIG. 15B is a diagram illustrating a configuration of a controller according to the embodiment of the present disclosure.

Referring to FIG. 15B, the controller 1520 may include an object extractor 1541 and a property information identifier 1543.

The controller 1520 may receive the image information through the interface 1545. Alternatively, the controller 1520 may receive the image information through an external server (not shown).

The controller 1520 receiving the image information may extract the object 1547 by controlling the object extractor 1541. Specifically, the controller 1520 can extract an object satisfying the predetermined conditions. Based on the deep learning based computer vision technique, the controller 1520 can classify the information included in the image and extract the object satisfying the predetermined conditions.

Further, the controller 1520 may determine the location information of the extracted object. Further, the controller 1520 may store the extracted object in the database.

The controller 1520 may identify the property information of the extracted object by controlling the property information identifier 1543.

The property information may include the size information 1549, the density information 1551, the shape information 1553 based on a predetermined shape 1557, and the like. The detailed content is the same as above and therefore will be omitted below.

The controller 1520 may map the property information of the object to the map information 1555. In addition, the controller 1520 may analyze the communication environment by performing the simulation using the map information to which the property information is mapped, and determine the optimal Tx location based thereon.

However, the operation of the controller 1520 is not limited thereto, and it is possible to control the entire computing device so as to perform the operation related to the computing device described in the embodiment.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a processor in a wireless communication system, the method comprising:
    obtaining, by the processor, data associated with an area of the wireless communication system;
    displaying, on a display controlled by the processor, each of at least one object affecting the wireless communication system;
    processing, by the processor, an analysis of a signal in the wireless communication system based on scattering, diffracting, refracting, and attenuating of the signal by each of the at least one object, using the data; and
    displaying, on the display controlled by the processor, information on a location in which a transceiver is to be deployed based on a result of the analysis,
    wherein the displaying of each of the at least one object further comprises displaying three-dimensional information of each of the at least one object that is identified based on the data.

2. The method of claim 1, wherein the displaying of each of the at least one object further comprises displaying, on the display by the processor, characteristic information of each of the at least one object.

3. The method of claim 1, wherein the at least one object includes a first part associated with the scattering of the signal and a second part which is not associated with the scattering of the signal.

4. The method of claim 3, wherein the first part includes foliage of a tree and the second part includes a trunk of the tree.

5. The method of claim 2,
    wherein the analysis is processed based on the characteristic information of each of the at least one object, and
    wherein the characteristic information includes type information, shape information, size information, or density information of the at least one object.

6. The method of claim 2,
    wherein the characteristic information includes at least one of shape information, size information, or type information of a first part of each of the at least one object, and
    wherein the characteristic information includes at least one of size information of a second part of each of the at least one object.

7. The method of claim 6,
    wherein the shape information includes at least one of triangle, inverted triangle, square, or circle,
    wherein the size information includes at least one of height information or width information, and
    wherein the characteristic information further includes density information of the at least one object including at least one of a high density state, a middle density state, or a sparse state.

8. A computing device in a wireless communication system, the computing device comprising:
    a memory;
    a display; and
    at least one processor configured to:
        obtain data associated with an area of the wireless communication system,
        display, on the display controlled by the at least one processor, each of at least one object affecting the wireless communication system,
        process an analysis of a signal in the wireless communication system based on scattering, diffracting, refracting, and attenuating of the signal by each of the at least one object, using the data, and display, on the display controlled by the at least one processor, information on a location in which a transceiver is to be deployed based on a result of the analysis, wherein the displaying of each of the at least one object further comprises displaying three-dimensional information of each of the at least one object that is identified based on the data.

9. The computing device of claim 8, wherein the at least one processor is further configured to display characteristic information of each of the at least one object.

10. The computing device of claim 8, wherein the at least one object includes a first part associated with the scattering of the signal and a second part which is not associated with the scattering of the signal.

11. The computing device of claim 10, wherein the first part includes foliage of a tree and the second part includes a trunk of the tree.

12. The computing device of claim 9,
wherein the analysis is processed based on the characteristic information of each of the at least one object, and
wherein the characteristic information includes type information, shape information, size information, or density information of the at least one object.

13. The computing device of claim 9,
wherein the characteristic information includes at least one of shape information, size information, or type information of a first part of each of the at least one object, and
wherein the characteristic information includes at least one of size information of a second part of each of the at least one object.

14. The computing device of claim 13,
wherein the shape information includes at least one of triangle, inverted triangle, square, or circle,
wherein the size information includes at least one of height information or width information, and
wherein the characteristic information further includes density information of the at least one object including at least one of a high density state, a middle density state, or a sparse state.

15. The method of claim 1, wherein the wireless communication system includes a fifth generation (5G) network.

16. The computing device of claim 8, wherein the wireless communication system includes a fifth generation (5G) network.

17. A method by a processor in a wireless communication system, the method comprising:
obtaining, by the processor, a plurality of two-dimensional images of an area;
determining, by the processor, three-dimensional image information of the area based on the plurality of two-dimensional images and location information corresponding to the plurality of two-dimensional images;
identifying, by the processor, at least one object affecting the wireless communication system based on the three-dimensional image information;
determining, by the processor, characteristic information of each of the at least one object;
processing, by the processor, an analysis of a signal based on scattering, diffracting, refracting, and attenuating of the signal by each of the at least one object;
determining information on a location in which a transceiver is to be deployed based on the analysis; and
displaying, on a display controlled by the processor, information associated with deployment of a transceiver based on a result of the analysis.

18. The method of claim 17,
wherein each of the at least one object includes a tree,
wherein the at least one object includes a first part associated with scattering of the signal and a second part which is not associated with the scattering of the signal, and
wherein the first part includes foliage of a tree and the second part includes a trunk of the tree.

19. The method of claim 17,
wherein the characteristic information is at least one of shape information, size information, or type information of a first part of each of the at least one object, and
wherein the characteristic information includes at least one of size information of a second part of each of the at least one object.

20. A computing device in a wireless communication system, the computing device comprising:
a transceiver; and
at least one processor coupled with the transceiver and configured to:
obtain, by the at least one processor, a plurality of two-dimensional images of an area,
determine, by the at least one processor, three-dimensional image information of the area based on the plurality of two-dimensional images and location information corresponding to the plurality of two-dimensional images,
identify, by the at least one processor, at least one object affecting the wireless communication system based on the three-dimensional image information,
determine, by the at least one processor, characteristic information of each of the at least one object,
process, by the at least one processor, an analysis of a signal based on scattering, diffracting, refracting, and attenuating of the signal by each of the at least one object,
determine information on a location in which a transceiver is to be deployed based on the analysis, and
display, on a display controlled by the at least one processor, information associated with deployment of a transceiver based on a result of the analysis.

21. The computing device of claim 20,
wherein each of the at least one object includes a tree,
wherein each of the at least one object includes a first part associated with scattering of the signal and a second part which is not associated with the scattering of the signal, and
wherein the first part includes foliage of a tree and the second part includes a trunk of the tree.

22. The computing device of claim 20,
wherein the characteristic information is at least one of shape information, size information, or type information of a first part of each of the at least one object, and
wherein the characteristic information includes at least one of size information of a second part of each of the at least one object.

* * * * *